US012724964B2

(12) United States Patent
Jiang et al.

(10) Patent No.: US 12,724,964 B2
(45) Date of Patent: Sep. 1, 2026

(54) TEXT MINING METHOD BASED ON ARTIFICIAL INTELLIGENCE, RELATED APPARATUS AND DEVICE

(71) Applicant: Tencent Technology (Shenzhen) Company Limited, Shenzhen (CN)

(72) Inventors: Jie Jiang, Shenzhen (CN); Guanglei Du, Shenzhen (CN); Zhilin Shi, Shenzhen (CN); Changwang Zhang, Shenzhen (CN); Jihong Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 748 days.

(21) Appl. No.: 18/073,519

(22) Filed: Dec. 1, 2022

(65) Prior Publication Data

US 2023/0111582 A1 Apr. 13, 2023

Related U.S. Application Data

(63) Continuation of application No. PCT/CN2021/102745, filed on Jun. 28, 2021.

(30) Foreign Application Priority Data

Sep. 22, 2020 (CN) ......................... 202011001027.4

(51) Int. Cl.
*G06F 40/279* (2020.01)
*G06F 16/26* (2019.01)
(Continued)

(52) U.S. Cl.
CPC ............ *G06F 40/279* (2020.01); *G06F 16/26* (2019.01); *G06F 40/166* (2020.01); *G06F 40/30* (2020.01)

(58) Field of Classification Search
CPC .... G06F 16/26; G06F 16/3331; G06F 40/129; G06F 40/166; G06F 40/279; G06F 40/284; G06F 40/30; G06F 40/53
See application file for complete search history.

(56) References Cited

U.S. PATENT DOCUMENTS 10,453,117 B1 * 10/2019 Reavely ................. G06N 5/027
10,586,174 B2 * 3/2020 Lev ........................ G06N 20/00
(Continued)

FOREIGN PATENT DOCUMENTS

CN 106033462 A 10/2016
CN 106970904 A 7/2017
(Continued)

OTHER PUBLICATIONS

Tencent Technology, WO, PCT/CN2021/102745, Sep. 15, 2021, 5 pgs.

(Continued)

*Primary Examiner* — Angela A Armstrong
(74) *Attorney, Agent, or Firm* — Morgan, Lewis & Bockius LLP

(57) ABSTRACT

This application discloses a text mining method based on artificial intelligence performed by a computer device. This application includes: obtaining domain candidate term features corresponding to domain candidate terms; obtaining term quality scores corresponding to the domain candidate terms according to the domain candidate term features; determining a new term from the domain candidate terms according to the term quality scores corresponding to the domain candidate terms; obtaining an associated text according to the new term; and determining a domain seed term as a domain new term in response to determining according to the associated text that the domain seed term satisfies a domain new term mining condition. By this application, new terms can be automatically selected from (Continued)

domain candidate terms based on a machine learning algorithm, thereby reducing manpower costs and well adapting to the rapid emergence of special new terms in the Internet era.

18 Claims, 11 Drawing Sheets

(51) Int. Cl.
*G06F 40/166* (2020.01)
*G06F 40/30* (2020.01)

(56) References Cited

U.S. PATENT DOCUMENTS 10,657,332 B2 5/2020 Zhang et al.
11,334,608 B2 * 5/2022 Mahata ............... G06F 16/3344
2009/0299998 A1 * 12/2009 Kim ...................... G06F 16/951 707/999.005
2010/0217591 A1 8/2010 Shpigel
2016/0117313 A1 * 4/2016 Ajmera ............... G06F 16/3344 704/9

FOREIGN PATENT DOCUMENTS

| | | | |
|---|---|---|---|
| CN | 106970919 | A | 7/2017 |
| CN | 107391486 | A | 11/2017 |
| CN | 110110322 | A | 8/2019 |
| CN | 110457708 | A | 11/2019 |
| CN | 111026861 | A | 4/2020 |
| CN | 111325018 | A | 6/2020 |
| CN | 111931501 | A | 11/2020 |
| WO | WO 2015029241 | A1 | 3/2015 |

OTHER PUBLICATIONS

Tencent Technology, IPRP, PCT/CN2021/102745, Mar. 28, 2023, 6 pgs.
Tencent Technology, ISR, PCT/CN2021/102745, Sep. 15, 2021, 2 pgs.

* cited by examiner

Manually enter a domain seed term

| Term identifier | Domain seed term | Domain | Select |
|---|---|---|---|
| 0001 | 打王者 | 手机游戏 | ○ |
| 0002 | 吃鸡 | 手机游戏 | ○ |
| 0003 | 上分 | 手机游戏 | ○ |
| + | + | + | |

Delete

FIG. 7

TEXT MINING METHOD BASED ON ARTIFICIAL INTELLIGENCE, RELATED APPARATUS AND DEVICE

CROSS-REFERENCE TO RELATED APPLICATIONS

This application is a continuation application of PCT Patent Application No. PCT/CN2021/102745, entitled "ARTIFICIAL INTELLIGENCE-BASED TEXT MINING METHOD, RELATED APPARATUS, AND DEVICE" filed on Jun. 28, 2021, which claims priority to Chinese Patent Application No. 202011001027.4, filed with the State Intellectual Property Office of the People's Republic of China on Sep. 22, 2020, and entitled "TEXT MINING METHOD BASED ON ARTIFICIAL INTELLIGENCE, RELATED APPARATUS AND DEVICE", all of which are incorporated herein by reference in their entirety.

FIELD OF THE TECHNOLOGY

This application relates to the field of natural language processing and big data processing, and in particular, to text mining.

BACKGROUND OF THE DISCLOSURE

In the field of natural language processing (NLP) research, terms have always been an important research object. For the Chinese language, there is no obvious dividing character between terms, and term segmentation is mainly performed with the assistance of an existing vocabulary and statistical rule. With the development of society and social networks, people's habits of using language and words have also changed, and new terms are constantly being created. Therefore, discovery of new terms has become an important task in NLP processing.

At present, new terms can be discovered based on a statistical method. In this method, candidate terms need to be obtained first, and then term formation probabilities are calculated according to statistical feature values of the candidate terms. In practice, the degree of solidification and the degree of freedom are used together as statistical features of the candidate terms, that is, the candidate terms of which the degree of coagulation and the degree of freedom exceed a certain feature threshold are selected as new words.

SUMMARY

Embodiments of this application provide a text mining method based on artificial intelligence, related apparatus and device, by which new terms can be selected from domain candidate terms based on a machine learning algorithm, which avoids the process of manually setting a large number of feature thresholds, thereby reducing manpower costs and well adapting to the rapid emergence of special new terms in the Internet era.

In view of this, an aspect of this application provides a text mining method based on artificial intelligence performed by a computer device, including:

obtaining domain candidate term features corresponding to domain candidate terms;

obtaining term quality scores corresponding to the domain candidate terms according to the domain candidate term features;

determining a new term from the domain candidate terms according to the term quality scores corresponding to the domain candidate terms;

obtaining an associated text according to the new term; and determining a domain seed term as a domain new term in response to determining according to the associated text that the domain seed term satisfies a domain new term mining condition.

Another aspect of this application provides a text mining apparatus, including:

an obtaining module, configured to obtain domain candidate term features corresponding to domain candidate terms;

the obtaining module being further configured to obtain term quality scores corresponding to the domain candidate terms according to the domain candidate term features; and a determining module, configured to determine a new term from the domain candidate terms according to the term quality scores corresponding to the domain candidate terms;

the obtaining module being further configured to obtain an associated text according to the new term; and the determining module being further configured to determine a domain seed term as a domain new term in response to determining according to the associated text that the domain seed term satisfies a domain new term mining condition.

Another aspect of this application provides a computer device, including: a memory, a transceiver, a processor, and a bus system.

The memory is configured to store a program.

The processor is configured to execute the program in the memory, including executing the methods of the above aspects.

The bus system is configured to connect the memory and the processor to cause the memory and the processor to communicate with each other.

Another aspect of this application provides a non-transitory computer-readable storage medium, storing a computer program, the computer program being configured to the methods of the above aspects.

Another aspect of this application provides a computer program product or a computer program, the computer program product or the computer program including computer instructions, the computer instructions being stored in a computer-readable storage medium. A processor of a computer device reads the computer instructions from the computer-readable storage medium and executes the computer instructions to cause the computer device to execute the methods provided in the foregoing aspects.

Still another aspect of this application provides a computer program product including instructions, the instructions, when run on a computer, causing the computer to execute the methods provided in the foregoing aspects.

As can be seen from the foregoing technical solutions, the embodiments of this application have the following advantages.

In the embodiments of this application, a text mining method based on artificial intelligence is provided. First, domain candidate term features corresponding to domain candidate terms are obtained, then term quality scores corresponding to the domain candidate terms are obtained according to the domain candidate term features, a new term is determined from the domain candidate terms according to the term quality scores corresponding to the domain candidate terms, and an associated text is obtained according to the new term. A domain seed term is determined as a domain new term in response to determining according to the associated text that the domain seed term satisfies a domain new term mining condition. By the above method, new terms can be selected from domain candidate terms based on a machine learning algorithm, which avoids the process of manually setting a large number of feature thresholds, thereby reducing manpower costs and well adapting to the rapid emergence of special new terms in the Internet era.

BRIEF DESCRIPTION OF THE DRAWINGS

FIG. 7 is a schematic diagram of an interface for manually inputting domain seed terms according to an embodiment of this application.

DESCRIPTION OF EMBODIMENTS

Embodiments of this application provide a text mining method based on artificial intelligence, related apparatus and device, by which new terms can be selected from domain candidate terms based on a machine learning algorithm, which avoids the process of manually setting a large number of feature thresholds, thereby reducing manpower costs and well adapting to the rapid emergence of special new terms in the Internet era.

With the rise of various forms of social network media or platforms such as microblogs, the daily hot events are more focused, and the words included in the text content are gradually becoming colloquial, so a large quantity of new terms are created. Some new terms are completely new word combinations, and some are existing terms with new meanings. Therefore, the discovery of new terms has become an important task in NLP. The timely and accurate discovery of such new terms is of great significance for tracking real-time hot events, improving term segmentation and the indexing effect, etc. Based on this, this application provides a text mining method based on artificial intelligence, which is used to discover new terms and can further discover domain new terms.

It is to be understood that the text mining method provided in this application is applied to the field of artificial intelligence (AI), and specifically to natural language processing technology and machine learning (ML).

Figure 1:
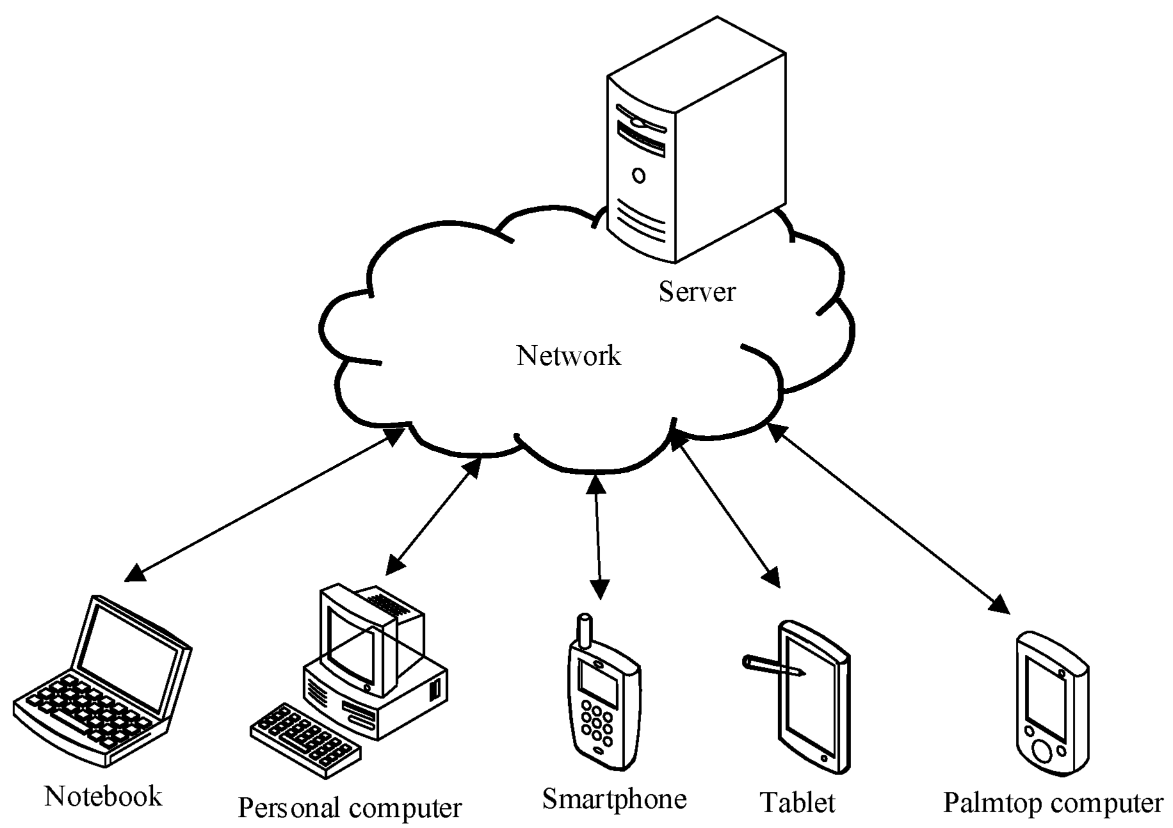
FIG. 1 is a schematic architecture diagram of a text mining system according to an embodiment of this application.

In order to realize the mining of new terms and domain new terms, this application proposes a text mining method based on artificial intelligence. The method is applied to a text mining system shown in FIG. 1. As shown in the figure, the text mining system includes a server and a terminal device. The client is deployed on the terminal device, and a text mining platform is deployed on the server as a text mining device.

The server involved in this application may be an independent physical server, or may be a server cluster or a distributed system formed by a plurality of physical servers, or may be a cloud server that provides basic cloud computing services such as a cloud service, a cloud database, cloud computing, a cloud function, cloud storage, a network service, cloud communication, a middleware service, a domain name service, a security service, a content delivery network (CDN), big data, and an AI platform. The terminal device may be a smartphone, a tablet computer, a notebook computer, a palmtop computer, a personal computer, a smart television, a smart watch, etc., but is not limited thereto. The terminal device and the server may be directly or indirectly connected in a wired or wireless communication manner, which is not limited in this application. The number of servers and the number of terminal devices are also not limited.

Figure 2:
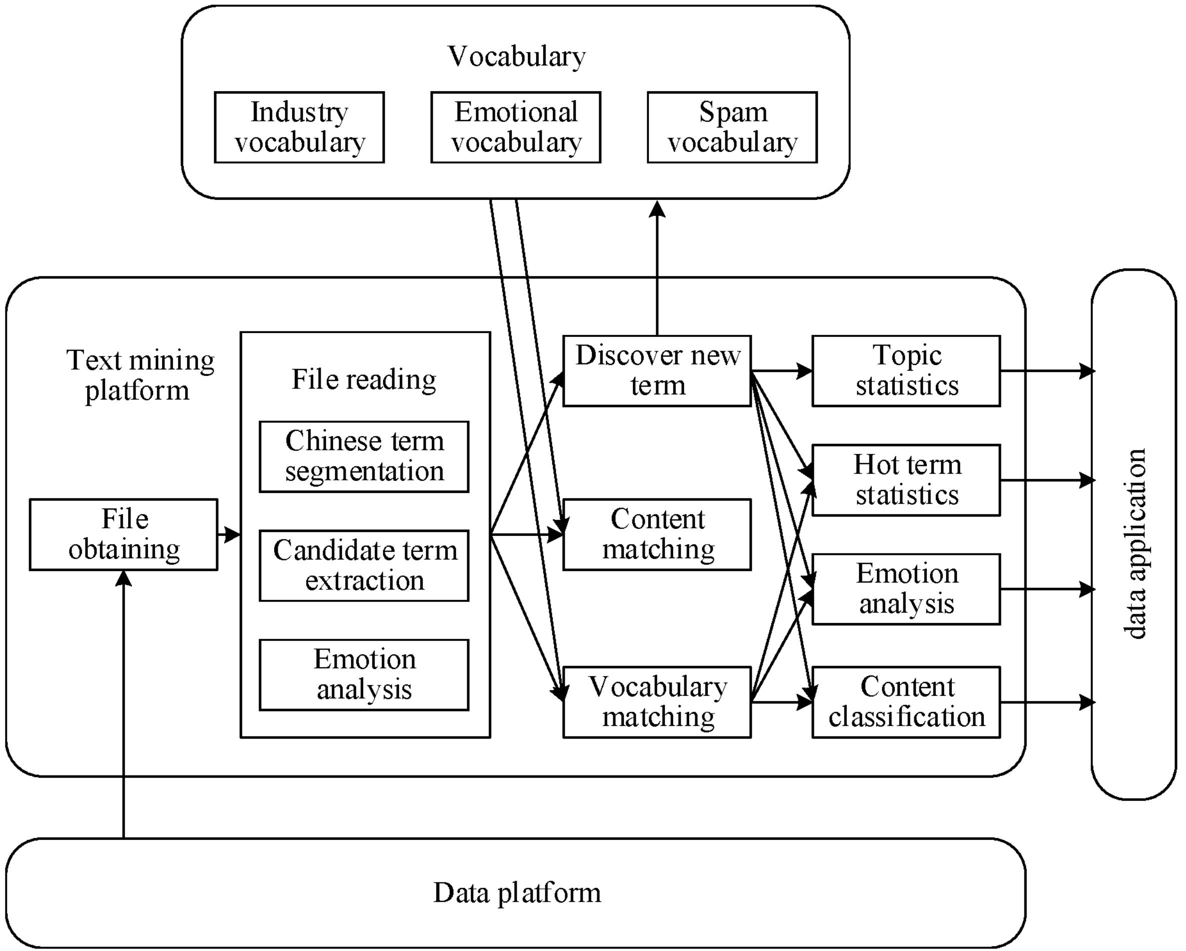
FIG. 2 is a schematic diagram of generating a domain corpus based on big data according to an embodiment of this application.

Further, referring to FIG. 2, FIG. 2 is a schematic diagram of generating a domain corpus based on big data according to an embodiment of this application. As shown in the figure, the text mining platform accesses data in a data platform to obtain files. The files may be network files that a user has accessed through a browser, or network files continuously obtained from various websites through a web crawler technology. Then the collected files are sorted chronologically, a content of each file is parsed, and a qualified text is extracted and added to a domain corpus. Processing such as term segmentation, domain candidate term extraction, and emotion analysis may further be performed on the text in the domain corpus, so as to implement operations such as new term discovery, content matching, and vocabulary matching. New terms found may be added to a vocabulary. The vocabulary includes but is not limited to an industry vocabulary, an emotion vocabulary and a spam vocabulary. Based on the result of new term discovery, topic statistics, hot term statistics, emotion analysis, and content classification may further be performed, and finally the application of data can be realized.

The data platform can provide big data, which is a branch of cloud technology. The cloud technology is a hosting technology that unifies a series of resources such as hardware, software, and network resources in a wide area network or a local area network to implement data computing, storage, and processing.

Some technologies and related terms involved in this application are briefly introduced before introducing the text mining method based on artificial intelligence that is provided in this application.

1. Domain new term: Domain new terms are special terms or commonly-used terms mainly used in a certain domain. For example, "王者荣耀" (Honor of Kings) and "吃鸡" (PUBG) are new terms in the game domain. In another example, a company releases a new game called "救地鼠" (Save the Gopher), and this new game did not exist before, so "救地鼠" is a domain new term.

2. Domain seed term: Domain seed terms mainly refer to terms that often appear in domain texts and can represent the meaning of the domain to a certain extent. For example, for a text content involved in the domain of mobile games, domain seed terms may be "手机" (mobile phone), "游戏" (game), "手游" (mobile game), "游戏应用" (game application) and so on.

3. Term segmentation: It is a process of recombining consecutive character sequences into word sequences according to a specific rule. Existing term segmentation algorithms may be divided into three categories: a character string matching-based term segmentation method, an understanding-based term segmentation method, and a statistics-based term segmentation method. According to whether term segmentation is combined with a part-of-speech tagging process, the term segmentation algorithms may alternatively be divided into a pure term segmentation method and an integral method in which term segmentation is combined with part-of-speech tagging.

4. Distantly supervised learning: In this application, it refers to the use of a vocabulary of a general domain or of a certain domain to guide the mining and discovery of new terms in other domains.

5. Language model (N-Gram): It is an algorithm based on a statistical language model. Its basic idea is to perform a sliding window operation of size N on the content of a text based on single words or terms to form a character sequence of length N. In this application, domain candidate terms may be generated using the N-Gram algorithm.

6. Random forest: It is an ensemble learning algorithm composed of decision trees. Each decision tree independently predicts events, and the final result is determined by weighting all the prediction results.

7. Positive sample pool: It consists of domain candidate term positive samples. During model training, training data are domain candidate term positive samples extracted from the positive sample pool.

8. Negative sample pool: It consists of a large number of domain candidate term negative samples and optionally few domain candidate term positive samples. During model training, training data are domain candidate term negative samples extracted from the negative sample pool.

9. Degree of solidification: It indicates the degree of closeness between characters constituting a domain candidate term, and is generally measured by a posterior probability of a fixed collocation of a character. For example, when the degree of solidification indicates the degree to which "怕" and "上火" are used at the same time. If "怕" is only used in combination with "上火", the degree of solidification between the two is high, which means one term. To calculate the degree of solidification, it is necessary to first calculate probabilities P("怕上火"), P("怕"), and P("上火"), which are respectively the probabilities of appearance in the domain candidate term. Degree of solidification ("怕" and "上火")=P("怕上火")/P("怕")*P("上火"). If there is only one combination "怕上火", the probabilities P("怕上火"), P("怕"), and P("上火") are the same, that is, the degree of solidification is equal to 1. If there is "怕蟑螂" or other combinations in addition to "怕上火", the degree of solidification becomes smaller.

10. Degree of freedom: It indicates the degree to which a domain candidate term can be used independently and freely. Generally, left and right information entropies of the term is used to measure the degree of freedom. For example, the degree of solidification of "巧克" in "巧克力" is very high and is the same as that of "巧克力", but its degree of freedom is almost zero, so "巧克" alone cannot be used as a term.

11. Term frequency (TF): It represents a frequency of appearance of a given domain candidate term in a text, that is, a ratio of the total number of times of appearance of the domain candidate term in the text to a total number of appearance of domain candidate terms contained in the text.

12. Inverse document frequency (IDF): It a measure representing the importance of a given domain candidate term. That is, the inverse document frequency can be obtained by first calculating a ratio of a total number of sentences to a number of sentences containing the domain candidate term and then taking a base 10 logarithm of the ratio.

13. Term frequency-inverse document frequency (TFIDF) value: It is a commonly used weighting technique for information retrieval and data mining, and is the product of term frequency (TF) and inverse document frequency (IDF). The TFIDF value can be used to assess the degree of repetition of a term for a file or for a set of domain files in a corpus.

14. Left information entropy: It is used to measure the richness of left collocations of the domain candidate term. It is calculated using a formula below, where X represents all possible left collocations (i.e., random variables) of the domain candidate term. The possible left collocations are all terms that have appeared immediately on the left side of the domain candidate term in the analyzed content. For example, for "你好", "小白兔", "哈哈，你好，小白兔, and 在干什么，小白兔", all possible left collocations of "小白兔" are "你好" and "在干什么". The calculation formula for the information entropy is as follows.

$$H(x) = -\sum_{i=1}^{n} p(x_i)\log(p(x_i)),$$

where, H(x) represents an information entropy of a random variable x, $p(x_i)$ represents a probability of an ith random event, and n represents a total number of random events.

15. Right information entropy: It is used to measure the richness of right collocations of the domain candidate term. It is calculated using a formula below, where X represents all possible right collocations (i.e., random variables) of the domain candidate term. The possible right collocations are all terms that have appeared immediately on the right side of the domain candidate term in the analyzed content.

Figure 3:
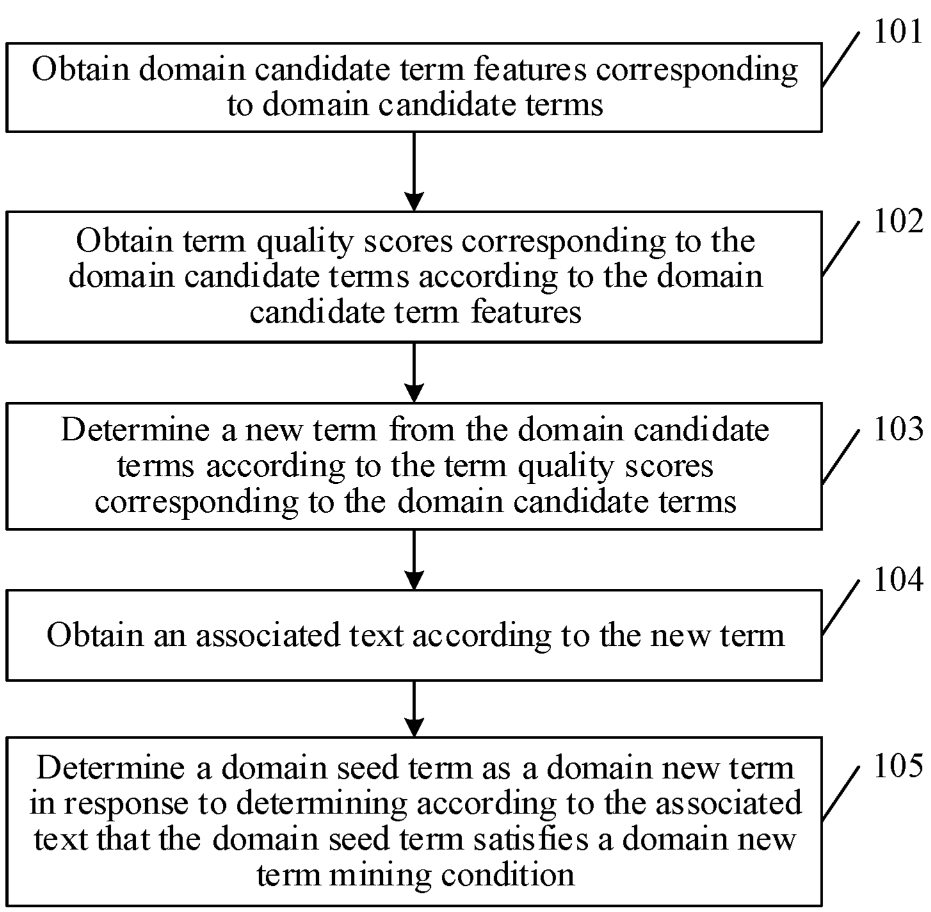
FIG. 3 is a schematic diagram of an embodiment of a text mining system based on artificial intelligence according to the embodiments of this application.

With reference to the above introduction, the text mining method based on artificial intelligence in this application will be introduced below. Referring to FIG. 3, this embodiment may be executed by a text mining device. An embodiment of the text mining method based on artificial intelligence in the embodiments of this application includes the following steps.

101. Obtain domain candidate term features corresponding to domain candidate terms.

In this embodiment, the text mining device first obtains a large number of sentences (for example, 100,000 sentences) from a domain corpus, and then performs term segmentation each sentence to obtain at least one domain candidate term. The at least one domain candidate term means one or more domain candidate terms, for example, including P domain candidate terms (where P is an integer greater than or equal to 1). The domain candidate terms are different from each other, and a corresponding domain candidate term feature may be extracted for each domain candidate term.

The text mining device may be a server or a terminal device, which is not limited in this application. It can be understood that the domain candidate term involved in this application may be one term, or may be a set including at least two terms.

102. Obtain term quality scores corresponding to the domain candidate terms according to the domain candidate term features.

In this embodiment, the text mining device uses the domain candidate term feature as an input to a text score estimation model, and the text score estimation model outputs a term quality score corresponding to the domain candidate term feature. That is, the term quality score and the domain candidate term also have a correspondence with each other. A higher term quality score indicates a higher possibility that the domain candidate term is a high-quality term. The high-quality term means that the term has reasonable semantics. For example, "巧克力" is a high-quality term, while "克力" has no complete and reasonable semantics and therefore is not a high-quality term.

103. Determine a new term from the domain candidate terms according to the term quality scores corresponding to the domain candidate terms.

In this embodiment, the text mining device may determine at least one new term from the domain candidate terms by filtering according to the term quality scores corresponding to the domain candidate terms. The at least one new term herein means one or more new terms, for example, including Q new terms (where Q is an integer greater than or equal to 1). For example, if the term quality score of the domain candidate term "打王者" (play Honor of Kings) reaches a quality score threshold, the domain candidate term "打王者" may be determined as a new term. In addition, in order to ensure that the new terms have a certain popularity, it is also necessary to determine whether the frequency of appearance of a domain candidate term is high enough. If the frequency of appearance of a domain candidate term reaches a threshold, it indicates that the domain candidate term has a certain popularity, and therefore the domain candidate term can be determined as a new term. On the contrary, if the frequency of appearance of the domain candidate term does not reach the threshold, it indicates that the domain candidate term may not be a general term, and it is determined that the domain candidate term is not a new term.

104. Obtain an associated text according to the new term.

In this embodiment, the text mining device crawls relevant associated texts from a search engine according to the new term. The associated text may be a set of texts, or may be a set including at least two sets of texts. For each new term, one associated text may be crawled. The associated text may be embodied in the form of a document, and multiple sentences are recorded in each associated text.

105. Determine a domain seed term as a domain new term in response to determining according to the associated text that the domain seed term satisfies a domain new term mining condition.

In this embodiment, the text mining device further needs to obtain a domain seed term from a domain seed term vocabulary, and then calculate a probability of occurrence of the domain seed term in the associated text. If the probability of occurrence reaches a threshold, it means that the domain new term mining condition is met, and therefore, the domain seed term may be marked as a domain new term. On the contrary, if the probability of occurrence does not reach the threshold, it means that the domain new term mining condition is not met, and it is determined that the domain seed term is not a domain new term.

Based on this, assuming that there are 5000 domain seed terms in the domain seed term vocabulary, probabilities of occurrence of these 5000 domain seed terms in the associated text may be calculated separately, and then it may be determined whether each domain seed term meets the domain new term mining condition. If a domain seed term meets the domain new term mining condition, the domain seed term may be determined as a domain new term.

The text mining method provided in this application may be applied to the discovery of new terms in short texts of social network group names. Testing results show that the accuracy rate of new terms ranked in the top 100 reaches 92.7%, and the accuracy rate of domain new terms ranked in the top 100 reaches 82.4%. Testing results show that the accuracy rate of all the new terms reaches 84.5%, and the accuracy rate of all the domain new terms reaches 67.2%. It can be seen that the text mining method based on artificial intelligence provided in this application can better mine domain new terms.

In the embodiments of this application, a text mining method based on artificial intelligence is provided. First, domain candidate term features corresponding to domain candidate terms are obtained, then term quality scores corresponding to the domain candidate terms are obtained according to the domain candidate term features, a new term is determined from the domain candidate terms according to the term quality scores corresponding to the domain candidate terms, and an associated text is obtained according to the new term. A domain seed term is determined as a domain new term in response to determining according to the associated text that the domain seed term satisfies a domain new term mining condition. By the above method, new terms can be selected from domain candidate terms based on a machine learning algorithm, which avoids the process of manually setting a large number of feature thresholds, thereby reducing manpower costs and well adapting to the rapid emergence of special new terms in the Internet era.

In some embodiments, on the basis of the embodiments corresponding to FIG. 3 above, in an embodiment of the text mining method provided in the embodiments of this application, before the obtaining domain candidate term features corresponding to the domain candidate terms, the method further includes:

obtaining sentences from a domain corpus;

performing term segmentation processing on each of the sentences to obtain a text sequence; and obtaining the domain candidate terms according to the text sequence.

In this embodiment, a method for determining domain candidate terms is introduced. The text mining device obtains at least one sentence from a domain corpus. The at least one sentence means one or more sentences, for example, including M sentences (where M is an integer greater than or equal to 1). The corpus stores language materials that have actually appeared in the actual use of the language. The corpus is a basic resource that carries language knowledge with an electronic computer as the carrier. The real language materials need to be analyzed and processed before it can be used as a useful resource. The domain corpus is a corpus for a certain domain, for example, a corpus in the game domain, or a corpus in the medical domain, etc. The type of the domain corpus is not limited in this application.

The text mining device performs term segmentation on the sentences from the domain corpus to obtain a corresponding text sequence. Chinese term segmentation may be implemented using a dictionary-based term segmentation algorithm or a machine learning-based algorithm. Dictionary-based term segmentation algorithms include a forward maximum matching method, a reverse maximum matching method, a two-way matching term segmentation method, etc. Machine learning-based algorithms include conditional random field (CRF), Hidden Markov Model (HMM), Support Vector Machine (SVM), etc.

For example, taking the sentence "北京福娃是奥运会吉祥物" as an example, a text sequence obtained by performing term segmentation on this sentence is "北京/福娃/是/奥运会/吉祥物", where "/" represents separation characters between terms. Based on this, at least one domain candidate term may be extracted from the text sequence. Taking the text sequence "北京/福娃/是/奥运会/吉祥物" as an example, at least one domain candidate term may be extracted, namely "北京", "福娃", "是", "奥运会", and "吉祥物". The domain candidate terms may also be extracted from the text sequence using the N-Gram algorithm, a supervised algorithm, a semi-supervised algorithm, or an unsupervised algorithm, which is not limited herein.

Based on this, statistics may be collected on indicators such as the term frequency, TFIDF value, degree of solidification, degree of freedom, left information entropy, right information entropy, term length, mutual information, position information, and term span of the domain candidate term in the sentence, and one or more of the indicators may be used as the domain candidate term feature corresponding to the domain candidate term.

Secondly, in the embodiments of this application, a method for extracting the domain candidate term feature is provided. By this method, sentences are obtained from a domain corpus, and then term segmentation processing is performed on the sentences. Text sequences obtained after the term segmentation are used as a source of domain candidate terms, so as to obtain relevant domain candidate terms. Further, a domain candidate term feature corresponding to each domain candidate term is extracted. Thereby, the feasibility and operability of the solution are improved.

In some embodiments, on the basis of the embodiments corresponding to FIG. 3 above, in another embodiment of the text mining method provided in the embodiments of this application, the obtaining a to-be-trained domain candidate term sample according to the text sequence further includes:

obtaining the domain candidate terms corresponding to the text sequence according to a term number sampling threshold and a character number sampling threshold, the term number sampling threshold representing an upper limit of a number of terms in the domain candidate terms, and the character number sampling threshold representing an upper limit of a number of characters in the domain candidate terms.

In this embodiment, a method for obtaining the domain candidate terms based on the N-Gram algorithm is introduced, and the N-Gram algorithm is used to sample a text sequence to obtain domain candidate terms. The N-Gram algorithm involves two hyperparameters: a term number sampling threshold (N) and a character number sampling threshold (maxLen). The term number sampling threshold is used to control a maximum number of terms that can be selected for combination, that is, an upper limit of the number of terms in the domain candidate term. The character number sampling threshold is used to control a maximum length of the domain candidate term, that is, an upper limit of the number of characters in the domain candidate term. For example, the term number sampling threshold N being 3 and the character number sampling threshold maxLen being 10 means that the domain candidate term has a maximum character length of 10, and consists of one term, two consecutive terms or three consecutive terms.

Specifically, taking the text sequence "北京/福娃/是/奥运会/吉祥物" as an example, assuming that the term number sampling threshold N is 3 and the character number sampling threshold maxLen is 6, the following domain candidate terms are obtained:

{北京}, {福娃}, {是}, {奥运会}, {吉祥物}, {北京福娃}, {福娃是}, {是奥运会}, {奥运会吉祥物}, {北京福娃是}, {福娃是奥运会}.

Further, in the embodiments of this application, a method for obtaining domain candidate terms based on the N-Gram algorithm is provided. By this method, an N-gram algorithm not only can be used to evaluate whether a sentence is reasonable or not, but can also be used to evaluate the degree of difference between two character strings. The N-gram algorithm contains all the information that the first several terms can provide. These terms have strong binding force on the occurrence of a current term, facilitating the extraction of more accurate and richer domain candidate terms.

In some embodiments, on the basis of the embodiments corresponding to FIG. 3 above, in another embodiment of the text mining method provided in the embodiments of this application, the obtaining domain candidate term features corresponding to domain candidate terms further includes:

obtaining the domain candidate term features corresponding to the domain candidate terms according to the text sequence, where the domain candidate term feature includes at least one of term frequency, a term frequency-inverse document frequency (TFIDF) value, a degree of freedom, a degree of solidification, a left information entropy, or a right information entropy.

In this embodiment, a method for extracting domain candidate term features is introduced. For each of the domain candidate terms, the term frequency, TFIDF value, degree of freedom, degree of solidification, left information entropy, right information entropy, and the like corresponding to the domain candidate term may be extracted. A method of obtaining a domain candidate term feature will be introduced below by taking a domain candidate term "福娃" as an example.

I. Calculation of Term Frequency:

a term frequency of the domain candidate term "福娃" represents a probability that the domain candidate term appears in the sentence (or text sequence). Generally, the more frequently a term appears in the text, the more probable the term is a core term. Assuming that the domain candidate term "福娃" appears m times in the sentence (or text sequence) and the total number of terms in the sentence (or text sequence) is n, the term frequency of the domain candidate term "福娃" is calculated based on the following formula:

$$TF_w = \frac{m}{n},$$

where, w represents the domain candidate term "福娃" a $TF_w$ represents the term frequency of the domain candidate term "福娃", m represents the number of times the domain candidate term "福娃" appears in the sentence (or text sequence), and n represents the total number of terms in the sentence (or text sequence).

II. Calculation of TFIDF Value:

a TFIDF value of the domain candidate term "福娃" is calculated from two parameters: term frequency and inverse document frequency. An inverse document frequency of the domain candidate term "福娃" represents a frequency the domain candidate term appears in a domain corpus. Assuming that there are X sentences including the domain candidate term "福娃" in the domain corpus and a total number of sentences in the domain corpus is Y, the inverse document frequency of the domain candidate term "福娃" is calculated based on the following formula:

$$IDF_w = \log_2 \frac{Y}{X},$$

where, w represents the domain candidate term "福娃", $IDF_w$ represents the inverse document frequency of the domain candidate term "福娃", X represents the number of sentences in the domain corpus that include the domain candidate term "福娃", and Y represents the total number of sentences in the domain corpus.

Therefore, the TFIDF value of the domain candidate term "福娃" is calculated based on the following formula:

$$TFIDF_w = TF_w \times IDF_w,$$

where, w represents the domain candidate term "福娃", $TF_w$ represents the term frequency of the domain candidate term "福娃", and $IDF_w$ represents the inverse document frequency of the domain candidate term "福娃".

III. Calculation of Degree of Freedom:

a degree of freedom of the domain candidate term "福娃" may be measured using an entropy. It is assumed that the domain candidate term "福娃" appears m times in total, there are d Chinese characters that have appeared on the left of "福娃", and these Chinese characters respectively appear d1, d2, . . . , and dm times, i.e., m=d1+d2+ . . . +dm. In this case, a probability of appearance of each Chinese character on the left of the domain candidate term "福娃" may be calculated, and the left information entropy may be calculated according to an entropy formula. Similarly, a probability of appearance of each Chinese character on the right of the domain candidate term "福娃" may be calculated, and the right information entropy may be calculated according to the entropy formula. The smaller one of the left information entropy and the right information entropy is used as the final degree of freedom. A smaller entropy indicates a lower degree of freedom.

IV. Calculation of Degree of Solidification:

to calculate the degree of solidification of the domain candidate term "福娃", it is first necessary to calculate a probability of the word "福", a probability of the word "娃" and a probability of the term "福娃", namely, P("福"), P("娃"), and P("福娃"). The probability herein is a probability of appearance in the domain candidate term. The degree of solidification of the domain candidate term "福娃" is calculated as follows: degree of solidification ("福" and "娃")=P("福娃")/(P("福")*P("娃")).

V. Calculation of Left Information Entropy and Right Information Entropy:

The left information entropy or the right information entropy of the domain candidate term "福娃" is calculated based on the following formula:

$$H(w) = -\sum_{i=1}^{C} p(w_i)\log((p)w_i),$$

where, H(w) represents an information entropy of the domain candidate term "福娃", $p(w_i)$ represents a probability of an ith domain candidate term "福娃", and C represents a total number of random events.

Further, in the embodiments of this application, a method for extracting the domain candidate term feature is provided. By this method, feature quantification may be performed on the domain candidate terms, and the relevant features of the domain candidate terms are extracted from the dimensions of term weights, positions of terms in a document, and associated information of the terms, so as to form the domain candidate term feature. The domain candidate term feature can well express the characteristics of the domain candidate term, and helps obtain a more accurate evaluation result of the domain candidate term.

In some embodiments, on the basis of the embodiments corresponding to FIG. 3 above, in another embodiment of the text mining method provided in the embodiments of this application, the obtaining term quality scores corresponding to the domain candidate terms according to the domain candidate term features further includes the following steps:

obtaining sub-scores corresponding to the domain candidate term features based on the domain candidate term features by using a decision tree included in a random forest model; and obtaining the term quality scores corresponding to the domain candidate terms according to the sub-scores corresponding to the domain candidate term features.

In this embodiment, a method for outputting term quality scores using a random forest model is introduced. The text score estimation model may be a decision tree model, a gradient boosting decision tree (GBDT), an extreme gradient boosting (XGBoost) algorithm, a random forest (RF) model, etc. This application is described using an example where the text score estimation model is a random forest model.

Figure 4:
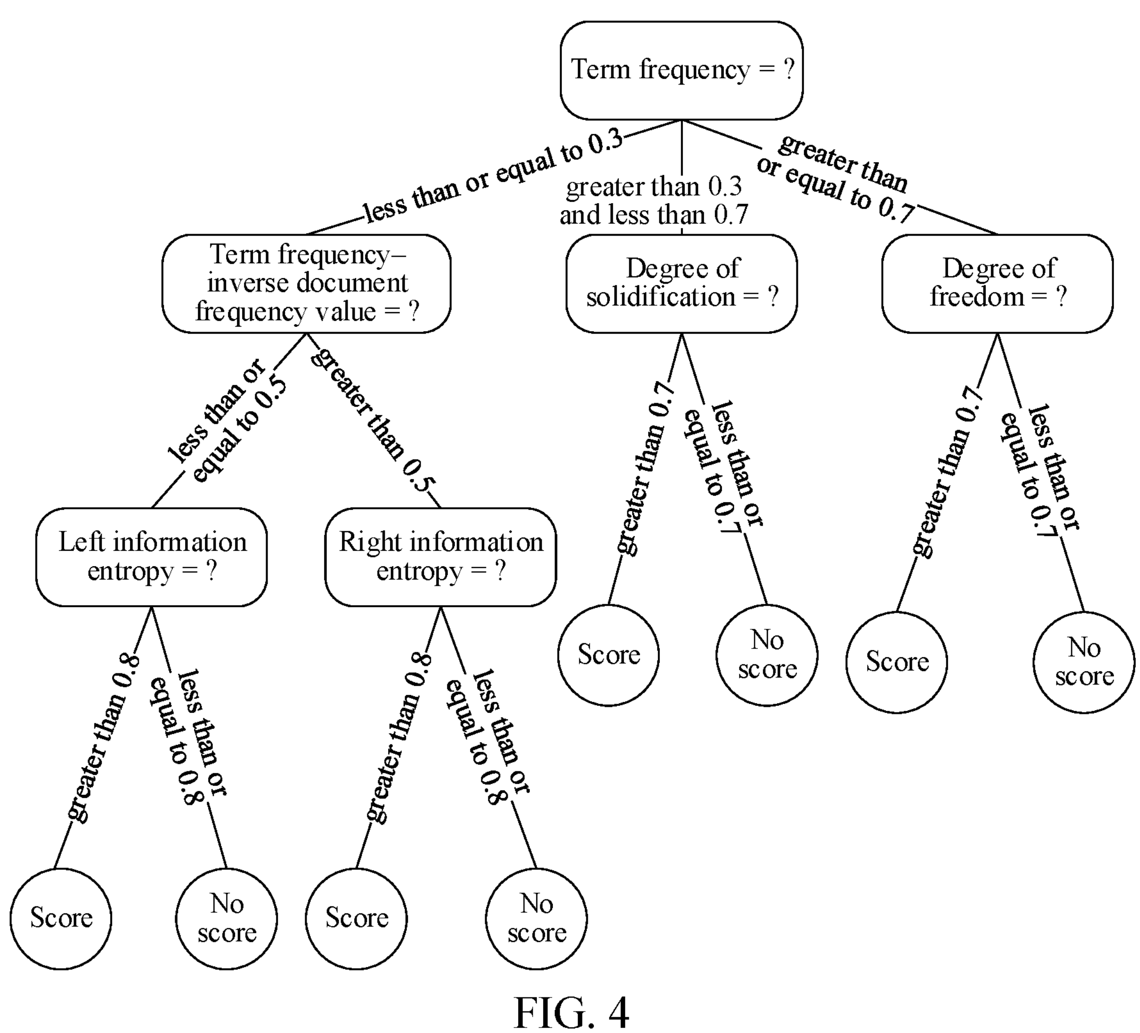
FIG. 4 is a schematic structural diagram of generating sub-scores based on a decision tree according to an embodiment of this application.

Specifically, the random forest model consists of T decision trees, and there is no association between the decision trees. When a domain candidate term feature corresponding to a domain candidate term is inputted to the obtained random forest model, each decision tree in the random forest model determines whether the domain candidate term is a high-quality term. If the domain candidate term is a high-quality term, the decision tree labels the domain candidate term as "score". If the domain candidate term is not a high-quality term, the decision tree labels the domain candidate term as "no score". For ease of understanding, referring to FIG. 4, FIG. 4 is a schematic structural diagram of generating sub-scores based on a decision tree according to an embodiment of this application. As shown in the figure, it is assumed that the domain candidate term feature corresponding to the domain candidate term "福娃" is inputted into one of the decision trees, the decision tree first determines a next branch based on a term frequency included in the domain candidate term feature. Assuming that the term frequency included in the domain candidate term feature is 0.2, the decision tree continues to determine whether a TFIDF value included in the domain candidate term feature is greater than or equal to 0.5. Assuming that the TFIDF value included in the domain candidate term feature is 0.8, the decision tree continues to determine whether a right information entropy included in the domain candidate term feature is greater than 0.8. Assuming that the right information entropy included in the domain candidate term feature is 0.9, the decision tree determines that the domain candidate term "福娃" is scored 1 point, that is, a sub-score outputted by the decision tree is 1.

Figure 5:
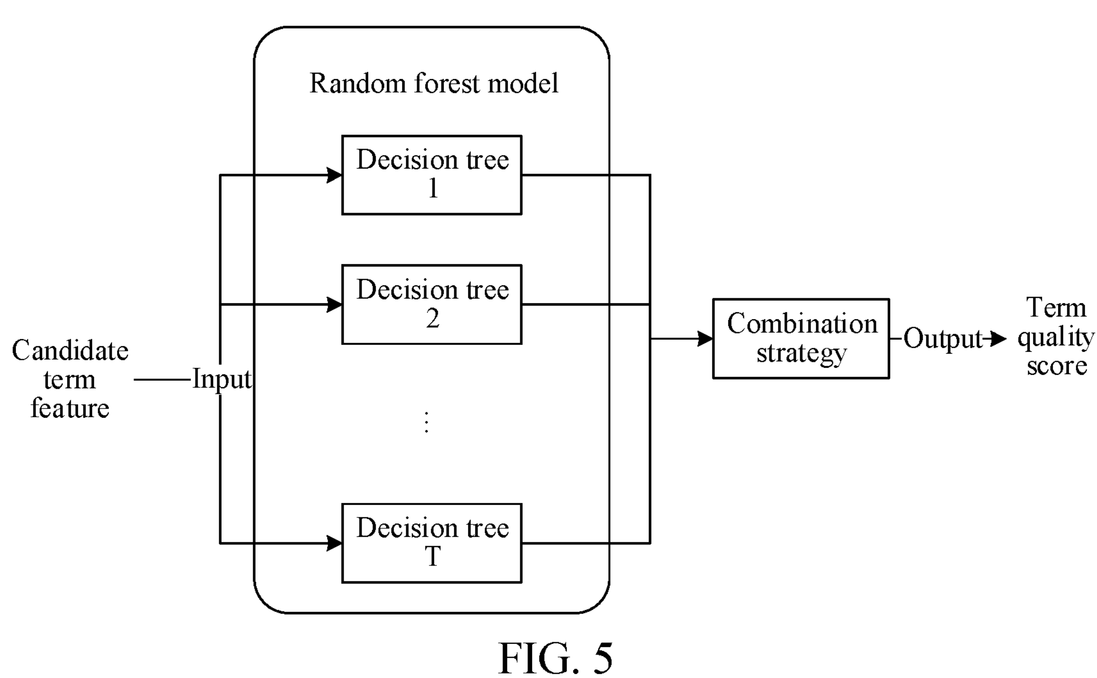
FIG. 5 is a schematic diagram of generating term quality scores based on a random forest model according to an embodiment of this application.

The random forest model constructed using a large number of decision trees can prevent overfitting. Although a single decision tree may overfit, the overfitting phenomenon can be eliminated by increasing the breadth. The T decision trees included in the random forest model use the principle of voting to calculate the term quality scores. Referring to FIG. 5, FIG. 5 is a schematic diagram of generating term quality scores based on a random forest model according to an embodiment of this application. As shown in the figure, assuming that T equals to 100, 100 sub-scores may be obtained, that is, a perfect score for the term quality score is 100. Based on this, it is assumed that the domain candidate term feature corresponding to the domain candidate term "福娃" is inputted into decision tree 1, and decision tree 1 outputs a sub-score value of "1"; the domain candidate term feature corresponding to the domain candidate term "福娃" is inputted to decision tree 2, and decision tree 2 outputs a sub-score value of "0"; and so on. Among 100 sub-scores, if 80 sub-scores are "1" and the remaining 20 sub-scores are "0", the final term quality score is "80".

It can be understood that different weight values may also be assigned to different decision trees. For example, weight values of decision tree 1 to decision tree 10 are 1, and weight values of decision tree 11 to decision tree 100 are 0.5. Different weight values are multiplied with the corresponding sub-scores and the resulting products are summed up to obtain the final term quality score.

Secondly, in the embodiments of this application, a method for outputting term quality scores using a random forest model is provided. By this method, the term quality scores predicted by the random forest model have high accuracy, and the importance of the domain candidate term features in the classification can be effectively evaluated through multiple decision trees. In addition, neither dimension reduction nor feature selection needs to be performed for the domain candidate term features, which makes it more efficient to obtain the term quality scores.

In some embodiments, on the basis of the embodiments corresponding to FIG. 3 above, in another embodiment of the text mining method provided in the embodiments of this application, the determining a new term from the domain candidate terms according to the term quality scores corresponding to the domain candidate terms further includes the following steps:

determining that a domain candidate term is a new term in response to the term quality score corresponding to the domain candidate term being greater than or equal to a quality score threshold; and determining that a domain candidate term is not a new term in response to the term quality score corresponding to the domain candidate term being less than the quality score threshold.

In this embodiment, a method for determining new terms based on term quality scores is introduced. For the convenience of description, in this embodiment, one domain candidate term is described by way of example. Whether other domain candidate terms are new terms may also be determined in a similar way, and the details will not be repeated here.

Specifically, for example, the quality score threshold equals to 60. In a first case, it is assumed that a term quality score of a domain candidate term is 80. Because the term quality score corresponding to the domain candidate term being 80 is greater than the quality score threshold of 60, the domain candidate term may be determined as a new term. In a second case, it is assumed that a term quality score of a domain candidate term is 50. Because the term quality score corresponding to the domain candidate term being 50 is less than the quality score threshold of 60, it may be determined that the domain candidate term is not a new term.

Secondly, in the embodiments of this application, a method for determining new terms based on term quality scores is provided. By this method, a domain candidate term with a high term quality score is used as a new term, which can ensure to a certain extent that the new term is of high quality and can be used as a candidate domain new term, thereby improving the reliability and accuracy of the selected new term.

In some embodiments, on the basis of the embodiments corresponding to FIG. 3 above, in another embodiment of the text mining method provided in the embodiments of this application, the determining a new term from the domain candidate terms according to the term quality scores corresponding to the domain candidate terms further includes the following steps:

obtaining term frequencies corresponding to the domain candidate terms;

determining that a domain candidate term is a new term in response to the term quality score corresponding to the domain candidate term being greater than or equal to a quality score threshold and the term frequency corresponding to the domain candidate term being greater than or equal to a first term frequency threshold; and determining that a domain candidate term is not a new term in response to the term quality score corresponding to the domain candidate term being less than the quality score threshold and the term frequency corresponding to the domain candidate term being less than the first term frequency threshold.

In this embodiment, a method for determining new terms based on term quality scores and term frequencies is introduced. For the convenience of description, in this embodiment, one domain candidate term is described by way of example. Whether other domain candidate terms are new terms may also be determined in a similar way, and the details will not be repeated here.

Specifically, for example, the quality score threshold equals to 60, and the first term frequency threshold equals to 0.2. In a first case, it is assumed that a term quality score of a domain candidate term is 80 and a term frequency corresponding to the domain candidate term is 0.5. Because the term quality score corresponding to the domain candidate term being 80 is greater than the quality score threshold of 60 and the term frequency corresponding to the domain candidate term being 0.5 is greater than or equal to the first term frequency threshold of 0.2, the domain candidate term may be determined as a new term. In a second case, it is assumed that a term quality score of a domain candidate term is 50 and a term frequency corresponding to the domain candidate term is 0.5. Because the term quality score corresponding to the domain candidate term being 50 is less than the quality score threshold of 60, and the term frequency corresponding to the domain candidate term being 0.5 is greater than the first term frequency threshold of 0.2, it may be determined that the domain candidate term is not a new term. In a third case, it is assumed that a term quality score of a domain candidate term is 80, and a term frequency corresponding to the domain candidate term is 0.1. Because the term quality score corresponding to the domain candidate term being 80 is greater than the quality score threshold of 60, and the term frequency corresponding to the domain candidate term being 0.1 is less than the first term frequency threshold of 0.2, it may be determined that the domain candidate term is not a new term. In a fourth case, it is assumed that a term quality score of a domain candidate term is 50, and a term frequency corresponding to the domain candidate term is 0.1. Because the term quality score corresponding to the domain candidate term being 50 is less than the quality score threshold of 60, and the term frequency corresponding to the domain candidate term being 0.1 is less than the first term frequency threshold of 0.2, it may be determined that the domain candidate term is not a new term.

Secondly, in the embodiments of this application, a method for determining new terms based on term quality scores and term frequencies is provided. By this method, a domain candidate term with a high term quality score is used as a new term, which can ensure to a certain extent that the new term is of high quality and can be used as a candidate domain new term, thereby improving the reliability and accuracy of the selected new term. In addition, the term frequency of the domain candidate term is also considered. By selecting a term with a high term frequency as a new term, it can be ensured to a certain extent that the new term has a high spreading rate, thereby satisfying the definition of new terms.

In some embodiments, on the basis of the embodiments corresponding to FIG. 3 above, in another embodiment of the text mining method provided in the embodiments of this application, the obtaining an associated text according to the new term further includes the following steps:

obtaining a search feedback result corresponding to the new term through a search engine, the search feedback result including at least one search result; and determining, according to the search feedback result corresponding to the new term, first R search results with highest degrees of relevance from the at least one search result as the associated text corresponding to the new term, R being an integer greater than or equal to 1.

In this embodiment, a method for obtaining an associated text is introduced. After the new term is obtained, a search is made using the new term. For the convenience of description, in this embodiment, one new term is described by way of example. For other new terms, associated texts may also be obtained in a similar way, and the details will not be repeated here.

Figure 6:
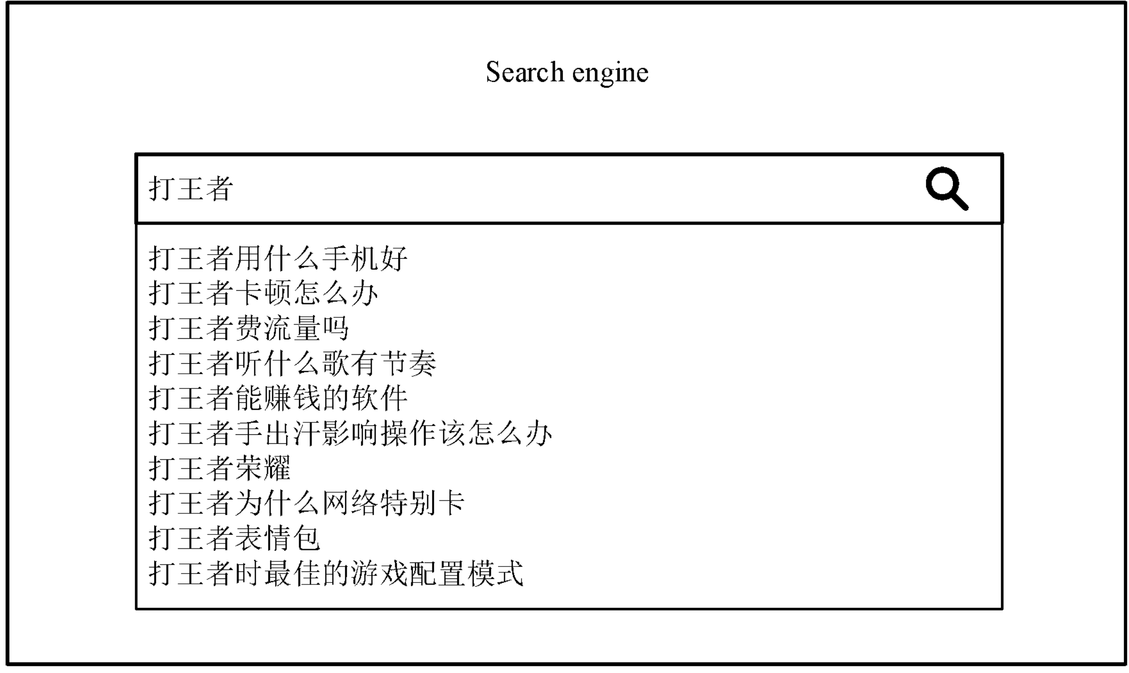
FIG. 6 is a schematic diagram of an interface for displaying a search feedback result through a search engine according to an embodiment of this application.

Specifically, taking a new term "打王者" as an example, a search feedback result may be obtained after the domain candidate term is inputted to a search engine. The search feedback result includes at least one search result. For ease of understanding, referring to FIG. 6, FIG. 6 is a schematic diagram of an interface for displaying a search feedback result through a search engine according to an embodiment of this application. As shown in the figure, a search feedback result is obtained after a domain candidate term "打王者" is inputted. The search feedback result includes 10 search results. After the 10 search results are sorted in descending order of relevance, a result shown in Table 1 is obtained.

TABLE 1

| Relevance | Search feedback result |
|---|---|
| First | 打王者用什么手机好 |
| Second | 打王者卡顿怎么办 |
| Third | 打王者费流量吗 |
| Fourth | 打王者听什么歌有节奏 |
| Fifth | 打王者能赚钱的软件 |
| Sixth | 打王者手出汗影响操作该怎么办 |
| Seventh | 打王者荣耀 |
| Eighth | 打王者为什么网络特别卡 |
| Ninth | 打王者表情包 |
| Tenth | 打王者时最佳的游戏配置模式 |

It can be seen from Table 1 that based on the search feedback result, first R search results with highest degrees of relevance may be determined as the associated text corresponding to the domain candidate term "上王者". Assuming that R is equal to 5, the associated text includes five search results, which are "打王者用什么手机好",qj "打王者卡顿怎么办", "打王者费流量吗", "打王者听什么歌有节奏", and "打王者能赚钱的软件".

Secondly, in the embodiments of this application, a method for obtaining an associated text is provided. By this method, the search feedback result of the search engine is used as a criterion for evaluating the frequency of use of the new term, which is more in line with the actual situation of the use of the new term, facilitating the finding of associated texts in the domain related to the new term.

In some embodiments, on the basis of the embodiments corresponding to FIG. 3 above, in another embodiment of the text mining method provided in the embodiments of this application, after the obtaining an associated text according to the new term, the method further includes the following steps:

obtaining the domain seed term;

determining an average term frequency of the domain seed term according to the associated text; and determining that the domain seed term satisfies the domain new term mining condition in response to the average term frequency being greater than or equal to a second term frequency threshold.

In this embodiment, a method for determining whether a domain seed term satisfies a domain new term mining condition based on an average term frequency is introduced. First, the domain seed term needs to be obtained, and then it is determined based on the associated text whether the domain seed term is a domain new term. The domain seed term is generally a manually entered term. For ease of understanding, referring to FIG. 7, FIG. 7 is a schematic diagram of an interface for manually inputting domain seed terms according to an embodiment of this application. As shown in the figure, a user may input a new domain seed term or delete an existing domain seed term through an interface for manually entering domain seed terms. Each domain seed term corresponds to one term identifier, and each domain seed term needs to be labeled with its corresponding domain. For example, in the "手机游戏" domain, domain seed terms may include "打王者", "吃鸡" and "上分". If a new domain seed term needs to be added, "+" may be clicked, and then relevant information may be inputted.

Specifically, taking the domain seed term "吃鸡" as an example, a to-be-processed term frequency of the domain seed term "吃鸡" is calculated based on the associated text. For ease of understanding, referring to Table 2, Table 2 schematically shows to-be-processed term frequencies of a domain seed term in at least one associated text. The at least one associated text herein means one or more associated texts, for example, including Q associated texts (where Q is an integer greater than or equal to 1). That is, associated texts have a one-to-one correspondence with new terms, and each associated text identifier is used to indicate an associated text corresponding to a new term.

TABLE 2

| Domain seed term "吃鸡" | |
|---|---|
| Associated text identifier | To-be-processed term frequency |
| 1 | 0.1 |
| 2 | 0.5 |
| 3 | 0.2 |
| | 0.3 |

It can be seen from Table 2 that an average term frequency of the domain seed term "吃鸡" is (0.1+0.5+0.2+0+0.3)/5=0.2. Assuming that the second term frequency threshold is 0.1. Because the average term frequency of the domain seed term "吃鸡" is greater than the second term frequency threshold of 0.1, the domain seed term "吃鸡" may be determined as a domain new term that satisfies the domain new term mining condition.

Further, in the embodiments of this application, a method for determining whether a domain seed term satisfies a domain new term mining condition based on an average term frequency is provided. By this method, if the average term frequency reaches the term frequency threshold, it is considered that the frequency of use of the domain seed term is high, and the domain seed term can be determined as a domain new term, thereby improving the feasibility of the solution.

In some embodiments, on the basis of the embodiments corresponding to FIG. 3 above, in another embodiment of the text mining method provided in the embodiments of this application, after the obtaining an associated text according to the new term, the method further includes the following steps:

obtaining the domain seed term;

determining a maximum term frequency of the domain seed term according to the associated text; and determining that the domain seed term satisfies the domain new term mining condition in response to the maximum term frequency being greater than or equal to a second term frequency threshold.

In this embodiment, a method for determining whether a domain seed term satisfies a domain new term mining condition based on a maximum term frequency is provided. First, the domain seed term needs to be obtained, and then it is determined based on the associated text whether the domain seed term is a domain new term. The domain seed term is generally a manually entered term. For the specific entering method, reference may be made to the foregoing embodiments, and the details will not be repeated here.

Specifically, taking the domain seed term "吃鸡" as an example, a to-be-processed term frequency of the domain seed term "吃鸡" is calculated based on the associated text. For ease of understanding, referring to Table 3, Table 3 also schematically shows to-be-processed term frequencies of a domain seed term in at least one associated text. The at least one associated text herein means one or more associated texts, for example, including Q associated texts (where Q is an integer greater than or equal to 1). That is, associated texts have a one-to-one correspondence with new terms, and each associated text identifier is used to indicate an associated text corresponding to a new term.

TABLE 3

| Domain seed term "吃鸡" | |
|---|---|
| Associated text identifier | To-be-processed term frequency |
| 1 | 0.1 |
| 2 | 0.8 |
| 3 | 0 |
| | 0 |

It can be seen from Table 3 that the maximum term frequency of the domain seed term "吃鸡" is 0.8. Assuming that the second term frequency threshold is 0.7. Because the average term frequency of the domain seed term "吃鸡" is greater than the second term frequency threshold of 0.7, the domain seed term "吃鸡" may be determined as a domain new term that satisfies the domain new term mining condition.

Further, in the embodiments of this application, a method for determining whether a domain seed term satisfies a domain new term mining condition based on a maximum term frequency is provided. By this method, if the maximum term frequency reaches the term frequency threshold, it is considered that the frequency of use of the domain seed term is high, and the domain seed term can be determined as a domain new term, thereby improving the feasibility of the solution.

Figure 8:
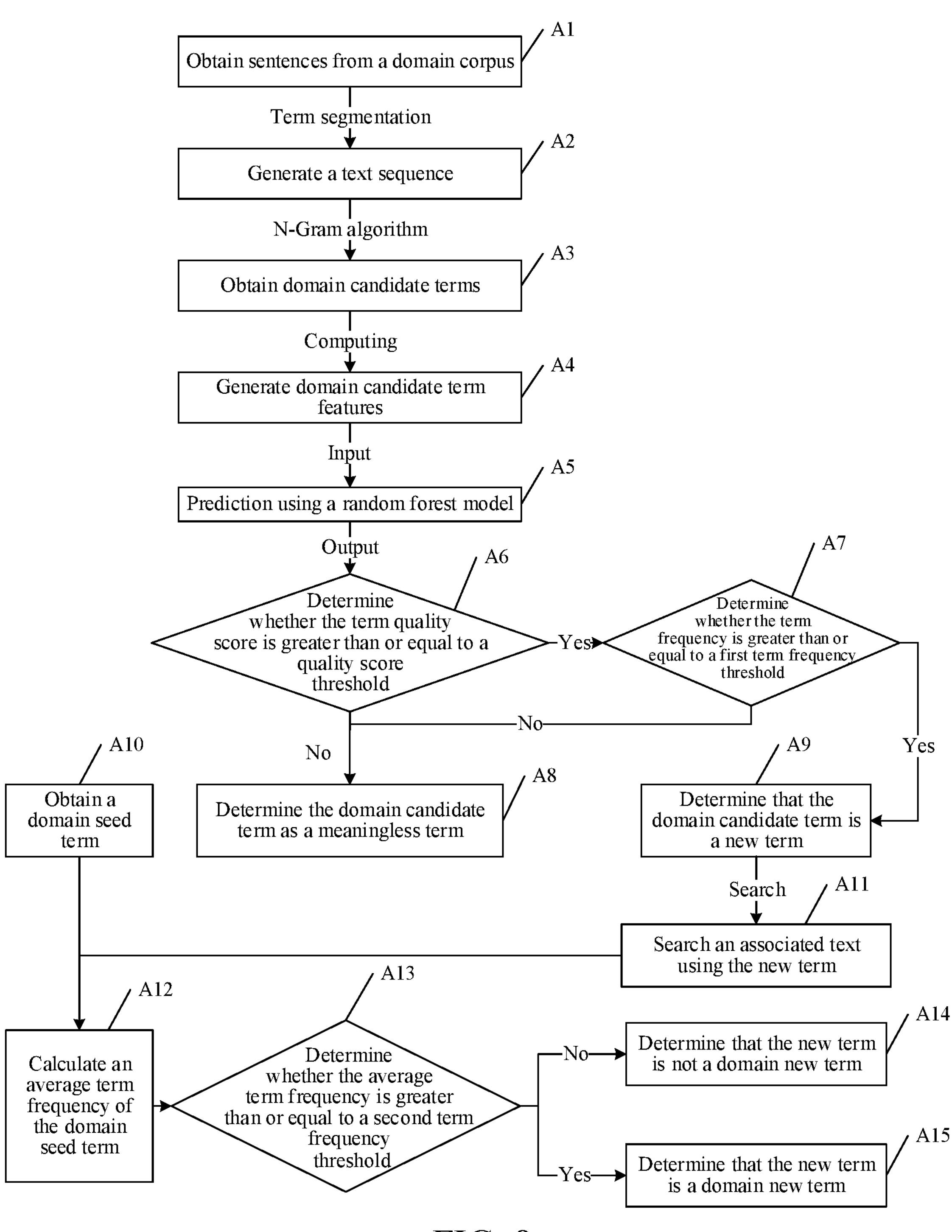
FIG. 8 is a schematic flowchart of mining domain new terms according to an embodiment of this application.

Based on the above introduction, referring to FIG. 8, FIG. 8 is a schematic flowchart of mining domain new terms according to an embodiment of this application. As shown in the figure, the following steps are included.

In step A1, a sentence is obtained from a domain corpus. The sentence may include M sentences.

In step A2, term segmentation is performed on the obtained sentence to obtain a corresponding text sequence. The text sequence may include M text sequences.

In step A3, N-Gram is used to extract a domain candidate term from the text sequence.

In step A4, a domain candidate term feature of the domain candidate term is calculated.

In step A5, the domain candidate term feature is inputted into a trained random forest model for prediction, so that the random forest model outputs a term quality score.

In step A6, it is determined whether the term quality score of the domain candidate term is greater than or equal to a quality score threshold. If the term quality score is greater than or equal to the quality score threshold, step A7 is executed. If the term quality score is less than the quality score threshold, step A8 is executed.

In step A7, it is determined whether a term frequency of the domain candidate term is greater than or equal to a first term frequency threshold. If the term frequency of the domain candidate term is greater than or equal to the first term frequency threshold, step A9 is executed. If the term frequency of the domain candidate term is less than the first term frequency threshold, step A8 is executed.

In step A8, the domain candidate term is determined a meaningless term.

In step A9, it is determined that the domain candidate term is a new term.

In step A10, a domain seed term is obtained from a domain seed vocabulary.

In step A11, an associated text is searched using the new term.

In step A12, based on the found associated text, an average term frequency (or maximum term frequency) of the domain seed term may be calculated.

In step A13, it is determined whether the average term frequency (or maximum term frequency) of the domain seed term is greater than or equal to a second term frequency threshold. If the average term frequency (or maximum term frequency) of the domain seed term is greater than or equal to the second term frequency threshold, step A15 is executed. If the average term frequency (or maximum term frequency) of the domain candidate term is less than the second term frequency threshold, step A14 is executed.

In step A14, it is determined that the new term is not a domain new term.

In step A15, it is determined that the new term is a domain new term.

In some embodiments, on the basis of the embodiments corresponding to FIG. 3 above, in another embodiment of the text mining method provided in the embodiments of this application, the method further includes the following steps:

obtaining K groups of domain candidate term samples, each group of domain candidate term samples including a domain candidate term positive sample and a domain candidate term negative sample, the domain candidate term positive sample being from a positive sample pool, the domain candidate term negative sample being from a negative sample pool, and K being an integer greater than or equal to 1;

obtaining K groups of domain candidate term sample features according to the K groups of domain candidate term samples, the domain candidate term sample features and the domain candidate term samples having a one-to-one correspondence, and each domain candidate term sample feature including a domain candidate term sample feature corresponding to the domain candidate term positive sample and a domain candidate term sample feature corresponding to the domain candidate term negative sample;

obtaining K groups of prediction results based on the K groups of domain candidate term sample features by using a to-be-trained text score estimation model, the prediction results and the domain candidate term sample features having a one-to-one correspondence, and each group of prediction result including a predicted label of the domain candidate term positive sample and a predicted label of the domain candidate term negative sample; and training the to-be-trained text score estimation model according to the K groups of prediction results and the K groups of domain candidate term samples until a model training condition is satisfied, and outputting a text score estimation model; and the obtaining term quality scores corresponding to the domain candidate terms according to the domain candidate term features further includes:

obtaining the term quality scores corresponding to the domain candidate terms based on the domain candidate term features by using the text score estimation model. In this embodiment, a method for training a text score estimation model is introduced. Assuming that the to-be-trained text score estimation model is a decision tree model, K is equal to 1. Assuming that the to-be-trained text score estimation model is a random forest model, K is equal to T, where K is an integer greater than 1.

Specifically, for example, the to-be-trained text score estimation model is a to-be-trained random forest model, and each of K groups of domain candidate term samples is used to train a decision tree. Each group of domain candidate term samples includes a domain candidate term positive sample and a domain candidate term negative sample. The number of domain candidate term positive samples may be equal to the number of domain candidate term negative samples. Similarly, a domain candidate term sample feature corresponding to each domain candidate term sample in each group of domain candidate term samples is extracted, thus obtaining K groups of domain candidate term sample features. Each domain candidate term sample feature includes a domain candidate term sample feature corresponding to the domain candidate term positive sample and a domain candidate term sample feature corresponding to the domain candidate term negative sample.

Figures 9, 10:
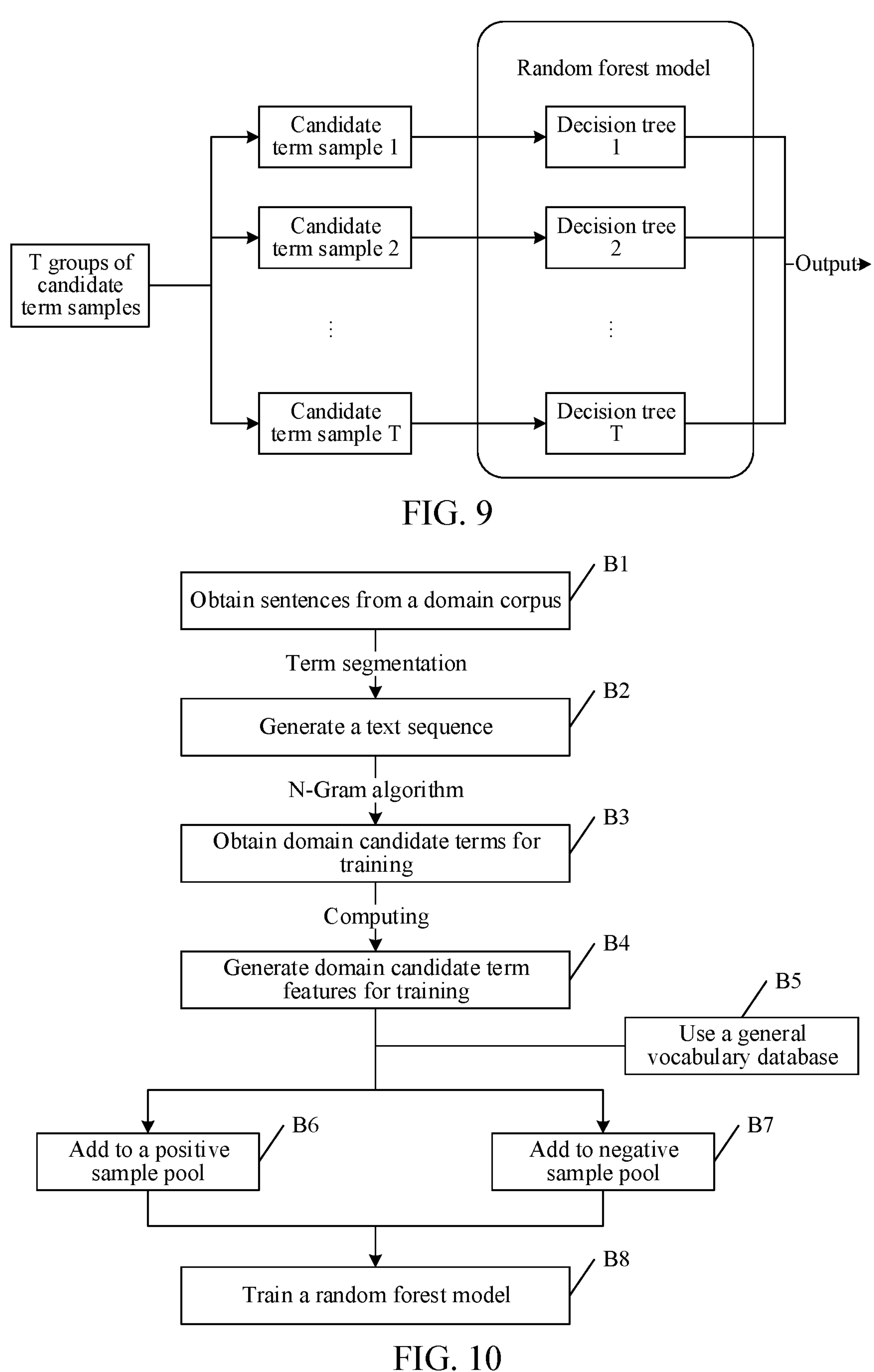
FIG. 9 is a schematic diagram of a training framework of a random forest model according to an embodiment of this application.
FIG. 10 is a schematic flowchart of training a text score estimation model according to an embodiment of this application.

For ease of understanding, referring to FIG. 9, FIG. 9 is a schematic diagram of a training framework of a random forest model according to an embodiment of this application. As shown in the figure, in the example where the to-be-trained text score estimation model is a random forest model, that is, K equals to T, the T groups of domain candidate term samples are divided into domain candidate term sample 1 to domain candidate term sample T, and then a domain candidate term sample feature corresponding to each group of domain candidate term samples is separately obtained, thus obtaining domain candidate term sample feature 1 to domain candidate term sample feature T. Each group of domain candidate term sample features is inputted into decision trees in the to-be-trained random forest model, and each decision tree is separately trained. Each decision tree outputs a corresponding prediction result. When a model training condition is met, T decision trees are outputted, thus obtaining a random forest model.

The to-be-trained text score estimation model may be a to-be-trained random forest model, decision tree model, or other types of models.

It can be understood that when the number of iterations of a decision tree reaches a threshold or a loss value converges or the loss value is 0, it may be determined that the model training condition is met. In this case, the text score estimation model may be outputted.

For ease of understanding, referring to FIG. 10, FIG. 10 is a schematic flowchart of training a text score estimation model according to an embodiment of this application. As shown in the figure, the following steps are included.

In step B1, a sentence is obtained from a domain corpus. The sentence may include S sentences.

In step B2, term segmentation is performed on the obtained sentence to obtain a corresponding text sequence. The text sequence may include S text sequences.

In step B3, N-Gram is used to extract a domain candidate term for model training from the text sequence (that is, to obtain a to-be-trained domain candidate term sample).

In step B4, a domain candidate term feature corresponding to the to-be-trained domain candidate term sample is calculated.

In step B5, the to-be-trained domain candidate term sample is classified using a general vocabulary database.

In step B6, if the to-be-trained domain candidate term sample hits the general vocabulary database, the to-be-trained domain candidate term sample is added to a positive sample pool.

In step B7, if the to-be-trained domain candidate term sample does not hit the general vocabulary database, the to-be-trained domain candidate term sample is added to a negative sample pool;

In step B8, domain candidate terms stored in the positive sample pool are used as domain candidate term positive samples, domain candidate terms stored in the negative sample pool are used as domain candidate term negative samples, and training is performed using the domain candidate term positive samples and the domain candidate term negative samples to obtain a text score estimation model, for example, obtain a random forest model.

Further, in the embodiments of this application, a method for training a text score estimation model is provided. By this method, positive and negative samples can be constructed using an accumulated general vocabulary database and domain corpus, and then the text score prediction model with supervised machine learning is trained to predict the term quality scores of the domain candidate terms. The selected text score estimation model can maximize the use of all the features of the domain candidate terms, and can adapt to domain candidate term positive samples and domain candidate term negative samples that are not very accurate. Based on a comprehensive consideration, a random forest model can be used for learning to achieve the above effect.

In some embodiments, on the basis of the embodiments corresponding to FIG. 3 above, in another embodiment of the text mining method provided in the embodiments of this application, before the obtaining K groups of domain candidate term samples, the method further includes the following steps:

- obtaining sentences from a domain corpus;
- performing term segmentation processing on the sentences to obtain a text sequence;
- obtaining a to-be-trained domain candidate term sample according to the text sequence;
- determining that the to-be-trained domain candidate term sample is a domain candidate term positive sample and adding the to-be-trained domain candidate term sample to the positive sample pool, in response to the to-be-trained domain candidate term sample hitting a general vocabulary database; and
- determining that the to-be-trained domain candidate term sample is a domain candidate term negative sample and adding the to-be-trained domain candidate term sample to the negative sample pool, in response to the to-be-trained domain candidate term sample not hitting the general vocabulary database.

In this embodiment, a method for adding domain candidate term samples to the positive sample pool and the negative sample pool is introduced. Similar to the content introduced in the foregoing embodiments, in the process of training a text score estimation model, at least one sentence is obtained from a domain corpus. The at least one sentence herein means one or more sentences, for example, including S sentences (where S is an integer greater than or equal to 1). Then, term segmentation is performed on the sentence to obtain a text sequence, and then a domain candidate term sample is extracted from the text sequence. Sentences used for training may be exactly the same as, partially the same as, or completely different from sentences used for prediction, which is not limited herein.

For the convenience of description, in this embodiment, one domain candidate term is described by way of example. Whether to add other domain candidate term samples to the positive sample pool or to the negative sample pool may also be determined in a similar way, and the details will not be repeated here.

Specifically, the extracted domain candidate term sample needs to be compared with the general vocabulary database. If the domain candidate term sample appears in the general vocabulary database, it is considered that the domain candidate term sample is a high-quality term, and the domain candidate term sample that hits the general vocabulary database is added to the positive sample pool, that is, it is determined that the domain candidate term sample is a domain candidate term positive sample. The domain candidate term sample that does not hit the general vocabulary database is added to the negative sample pool, that is, it is determined that the domain candidate term sample is a domain candidate term negative sample. It is foreseeable that the number of domain candidate term negative samples stored in the negative sample pool is much greater than the number of domain candidate term positive samples stored in the positive sample pool.

Further, in the embodiments of this application, a method for adding domain candidate term samples to the positive sample pool and the negative sample pool is provided. By this method, the domain candidate term samples can be more accurately classified into the positive sample pool or the negative sample pool by using the general vocabulary database, so as to facilitate subsequent training and improve the accuracy of training. In addition, matching based on the general vocabulary database avoids the process of manually classifying positive and negative samples, thereby improving the training efficiency.

Figure 11:
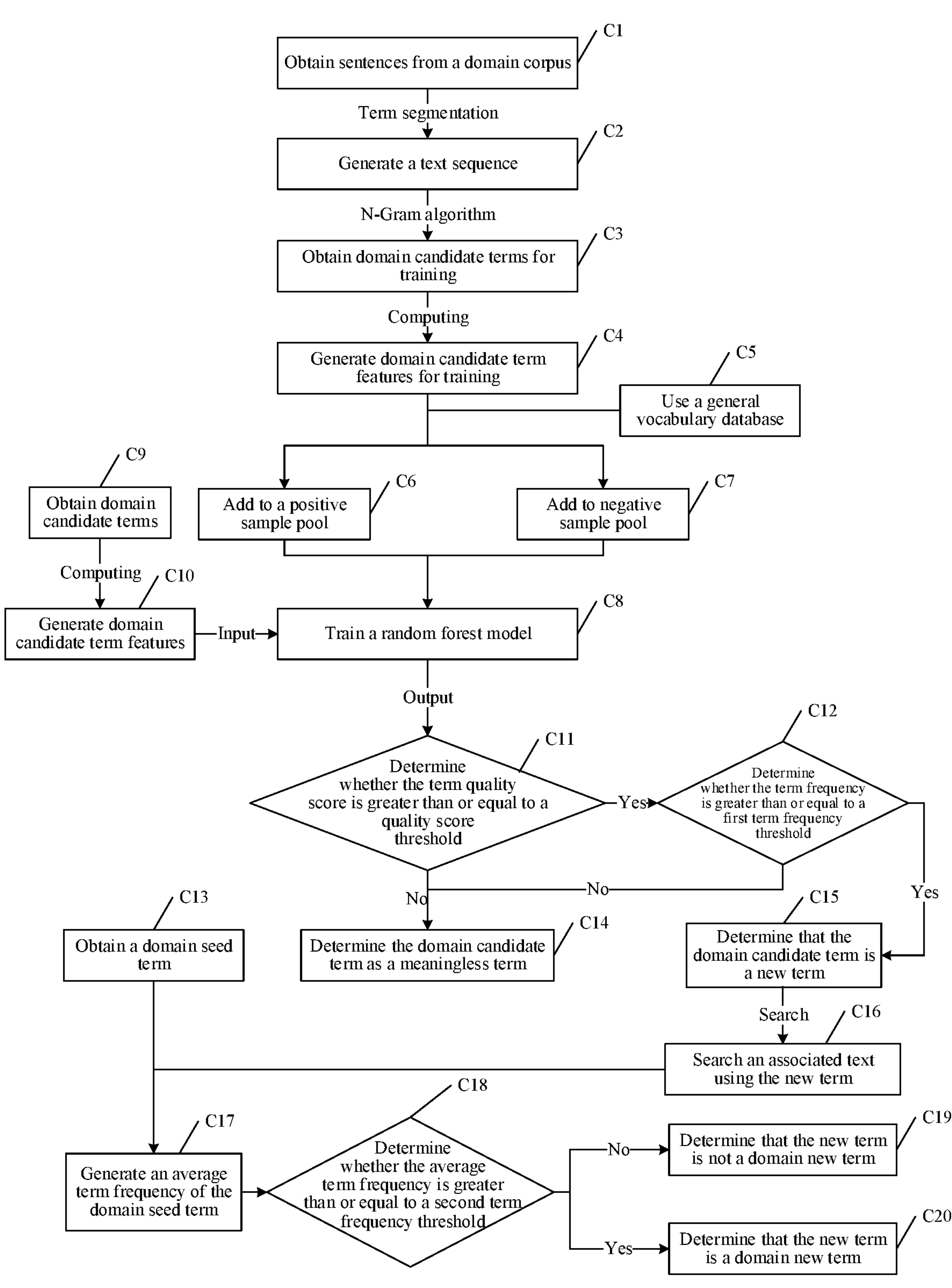
FIG. 11 is a schematic overall flowchart of a text mining method according to an embodiment of this application.

For ease of understanding, referring to FIG. 11, FIG. 11 is a schematic overall flowchart of a text mining method according to an embodiment of this application. As shown in the figure, the following steps are included.

In step C1, a sentence is obtained from a domain corpus. The sentence may include S sentences.

In step C2, term segmentation is performed on the obtained sentence to obtain a corresponding text sequence. The text sequence may include S text sequences.

In step C3, N-Gram is used to extract a domain candidate term for model training from the text sequence (that is, to obtain a to-be-trained domain candidate term sample).

In step C4, a domain candidate term feature corresponding to the to-be-trained domain candidate term sample is calculated.

In step C5, the to-be-trained domain candidate term sample is classified using a general vocabulary database.

In step C6, if the to-be-trained domain candidate term sample hits the general vocabulary database, the to-be-trained domain candidate term sample is added to a positive sample pool.

In step C7, if the to-be-trained domain candidate term sample does not hit the general vocabulary database, the to-be-trained domain candidate term sample is added to a negative sample pool;

In step C8, domain candidate terms stored in the positive sample pool are used as domain candidate term positive samples, domain candidate terms stored in the negative sample pool are used as domain candidate term negative samples, and training is performed using the domain candidate term positive samples and the domain candidate term negative samples to obtain a text score estimation model, for example, obtain a random forest model.

In step C9, N-Gram is used to extract a domain candidate term from the text sequence.

In step C10, a domain candidate term feature of the domain candidate term is calculated, and then the domain candidate term feature is inputted into a trained text score prediction model (such as random forest model) for prediction, so that the text score prediction model (such as random forest model) outputs a term quality score.

In step C11, it is determined whether the term quality score of the domain candidate term is greater than or equal to a quality score threshold. If the term quality score is greater than or equal to the quality score threshold, step C12 is executed. If the term quality score is less than the quality score threshold, step C14 is executed.

In step C12, it is determined whether a term frequency of the domain candidate term is greater than or equal to a first term frequency threshold. If the term frequency of the domain candidate term is greater than or equal to the first term frequency threshold, step C145 is executed. If the term frequency of the domain candidate term is less than the first term frequency threshold, step C14 is executed.

In step C13, a domain seed term is obtained from a domain seed vocabulary.

In step C14, the domain candidate term is determined a meaningless term.

In step C15, it is determined that the domain candidate term is a new term.

In step C16, an associated text is searched using the new term.

In step C17, based on the found associated text, an average term frequency (or maximum term frequency) of the domain seed term may be calculated.

In step C18, it is determined whether the average term frequency (or maximum term frequency) of the domain seed term is greater than or equal to a second term frequency threshold. If the average term frequency (or maximum term frequency) of the domain seed term is greater than or equal to the second term frequency threshold, step C20 is executed. If the average term frequency (or maximum term frequency) of the domain candidate term is less than the second term frequency threshold, step C19 is executed.

In step C19, it is determined that the new term is not a domain new term.

In step C20, it is determined that the new term is a domain new term.

Figure 12:
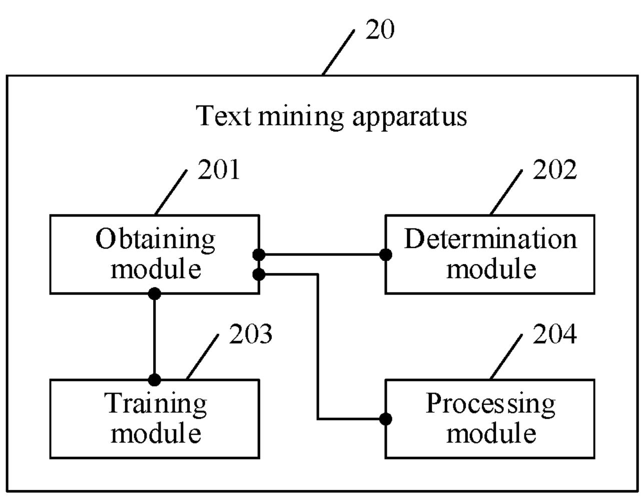
FIG. 12 is a schematic diagram of an embodiment of a text mining apparatus according to the embodiments of this application.

A text mining apparatus in this application will be described in detail below. Referring to FIG. 12, FIG. 12 is a schematic diagram of an embodiment of a text mining apparatus according to the embodiments of this application. The text mining apparatus 20 includes:

- an obtaining module 201, configured to obtain domain candidate term features corresponding to domain candidate terms;
- the obtaining module 201 being further configured to obtain term quality scores corresponding to the domain candidate terms according to the domain candidate term features; and
- a determining module 202, configured to determine a new term from the domain candidate terms according to the term quality scores corresponding to the domain candidate terms;
- the obtaining module 201 being further configured to obtain an associated text according to the new term; and
- the determining module 202 being further configured to determine a domain seed term as a domain new term in response to determining according to the associated text that the domain seed term satisfies a domain new term mining condition.

In the embodiments of this application, a text mining apparatus based on artificial intelligence is provided. First, domain candidate term features corresponding to domain candidate terms are obtained, then term quality scores corresponding to the domain candidate terms are obtained according to the domain candidate term features, a new term is determined from the domain candidate terms according to the term quality scores corresponding to the domain candidate terms, and an associated text is obtained according to the new term. A domain seed term is determined as a domain new term in response to determining according to the associated text that the domain seed term satisfies a domain new term mining condition. By the above method, new terms can be selected from domain candidate terms based on a machine learning algorithm, which avoids the process of manually setting a large number of feature thresholds, thereby reducing manpower costs and well adapting to the rapid emergence of special new terms in the Internet era.

In some embodiments, on the basis of the embodiment corresponding to FIG. 12 above, in another embodiment of the text mining apparatus 20 provided in the embodiments of this application,

- the obtaining module 201 is further configured to obtain sentences from a domain corpus;
- perform term segmentation processing on each of the sentences to obtain a text sequence; and
- obtain the domain candidate terms according to the text sequence.

In the embodiments of this application, a text mining apparatus based on artificial intelligence is provided. With the apparatus, sentences are obtained from a domain corpus, and then term segmentation processing is performed on the sentences. Text sequences obtained after the term segmentation are used as a source of domain candidate terms, so as to obtain relevant domain candidate terms. Further, a domain candidate term feature corresponding to each domain candidate term is extracted. Thereby, the feasibility and operability of the solution are improved.

In some embodiments, on the basis of the embodiment corresponding to FIG. 12 above, in another embodiment of the text mining apparatus 20 provided in the embodiments of this application,

- the obtaining module 201 is further configured to obtain the domain candidate terms corresponding to the text sequence according to a term number sampling threshold and a character number sampling threshold, the term number sampling threshold representing an upper limit of a number of terms in the domain candidate terms, and the character number sampling threshold representing an upper limit of a number of characters in the domain candidate terms.

In the embodiments of this application, a text mining apparatus based on artificial intelligence is provided. With the apparatus, an N-gram algorithm not only can be used to evaluate whether a sentence is reasonable or not, but can also be used to evaluate the degree of difference between two character strings. The N-gram algorithm contains all the information that the first several terms can provide. These terms have strong binding force on the occurrence of a current term, facilitating the extraction of more accurate and richer domain candidate terms.

In some embodiments, on the basis of the embodiment corresponding to FIG. 12 above, in another embodiment of the text mining apparatus 20 provided in the embodiments of this application, the obtaining module 201 is further configured to obtain the domain candidate term features corresponding to the domain candidate terms according to the text sequence, where the domain candidate term feature includes at least one of term frequency, a term frequency-inverse document frequency (TFIDF) value, a degree of freedom, a degree of solidification, a left information entropy, or a right information entropy.

In the embodiments of this application, a text mining apparatus based on artificial intelligence is provided. With the apparatus, feature quantification may be performed on the domain candidate terms, and the relevant features of the domain candidate terms are extracted from the dimensions of term weights, positions of terms in a document, and associated information of the terms, so as to form the domain candidate term feature. The domain candidate term feature can well express the characteristics of the domain candidate term, and helps obtain a more accurate evaluation result of the domain candidate term.

In some embodiments, on the basis of the embodiment corresponding to FIG. 12 above, in another embodiment of the text mining apparatus 20 provided in the embodiments of this application, the text score estimation model is a random forest model, where the random forest model includes T decisions trees, T being an integer greater than 1.

The obtaining module 201 is further configured to obtain sub-scores corresponding to the domain candidate term features based on the domain candidate term features by using a decision tree included in a random forest model; and obtain the term quality scores corresponding to the domain candidate terms according to the sub-scores corresponding to the domain candidate term features.

In the embodiments of this application, a text mining apparatus based on artificial intelligence is provided. With the apparatus, the term quality scores predicted by the random forest model have high accuracy, and the importance of the domain candidate term features in the classification can be effectively evaluated through multiple decision trees. In addition, neither dimension reduction nor feature selection needs to be performed for the domain candidate term features, which makes it more efficient to obtain the term quality scores.

In some embodiments, on the basis of the embodiment corresponding to FIG. 12 above, in another embodiment of the text mining apparatus 20 provided in the embodiments of this application, the determining module 202 is further configured to determine that a domain candidate term is a new term in response to the term quality score corresponding to the domain candidate term being greater than or equal to a quality score threshold; and determine that a domain candidate term is not a new term in response to the term quality score corresponding to the domain candidate term being less than the quality score threshold.

In the embodiments of this application, a text mining apparatus based on artificial intelligence is provided. With the apparatus, a domain candidate term with a high term quality score is used as a new term, which can ensure to a certain extent that the new term is of high quality and can be used as a candidate domain new term, thereby improving the reliability and accuracy of the selected new term.

In some embodiments, on the basis of the embodiment corresponding to FIG. 12 above, in another embodiment of the text mining apparatus 20 provided in the embodiments of this application, the determining module 202 is further configured to obtain term frequencies corresponding to the domain candidate terms;

determine that a domain candidate term is a new term in response to the term quality score corresponding to the domain candidate term being greater than or equal to a quality score threshold and the term frequency corresponding to the domain candidate term being greater than or equal to a first term frequency threshold; and determine that a domain candidate term is not a new term in response to the term quality score corresponding to the domain candidate term being less than the quality score threshold and the term frequency corresponding to the domain candidate term being less than the first term frequency threshold.

In the embodiments of this application, a text mining apparatus based on artificial intelligence is provided. With the apparatus, a domain candidate term with a high term quality score is used as a new term, which can ensure to a certain extent that the new term is of high quality and can be used as a candidate domain new term, thereby improving the reliability and accuracy of the selected new term. In addition, the term frequency of the domain candidate term is also considered. By selecting a term with a high term frequency as a new term, it can be ensured to a certain extent that the new term has a high spreading rate, thereby satisfying the definition of new terms.

In some embodiments, on the basis of the embodiment corresponding to FIG. 12 above, in another embodiment of the text mining apparatus 20 provided in the embodiments of this application, the obtaining module 201 is further configured to obtain a search feedback result corresponding to the new term through a search engine, the search feedback result including at least one search result; and determine, according to the search feedback result corresponding to the new term, first R search results with highest degrees of relevance from the at least one search result as the associated text corresponding to the new term, R being an integer greater than or equal to 1.

The associated texts are obtained according to the associated text corresponding to each domain candidate term.

In the embodiments of this application, a text mining apparatus based on artificial intelligence is provided. With the apparatus, the search feedback result of the search engine is used as a criterion for evaluating the frequency of use of the new term, which is more in line with the actual situation of the use of the new term, facilitating the finding of associated texts in the domain related to the new term.

In some embodiments, on the basis of the embodiment corresponding to FIG. 12 above, in another embodiment of the text mining apparatus 20 provided in the embodiments of this application, the obtaining module 201 is further configured to obtain the domain seed term after obtaining the associated text according to the new term;

the determining module 202 is further configured to determine an average term frequency of the domain seed term according to the associated text; and the determining module 202 is further configured to determine that the domain seed term satisfies the domain new term mining condition in response to the average term frequency being greater than or equal to a second term frequency threshold.

In the embodiments of this application, a text mining apparatus based on artificial intelligence is provided. With the apparatus, if the average term frequency reaches the term frequency threshold, it is considered that the frequency of use of the domain seed term is high, and the domain seed term can be determined as a domain new term, thereby improving the feasibility of the solution.

In some embodiments, on the basis of the embodiment corresponding to FIG. 12 above, in another embodiment of the text mining apparatus 20 provided in the embodiments of this application, the obtaining module 201 is further configured to obtain the domain seed term after obtaining the associated text according to the new term;

the determining module 202 is further configured to determine a maximum term frequency of the domain seed term according to the associated text; and the determining module 202 is further configured to determine that the domain seed term satisfies the domain new term mining condition in response to the maximum term frequency being greater than or equal to a second term frequency threshold.

In the embodiments of this application, a text mining apparatus based on artificial intelligence is provided. With the apparatus, if the maximum term frequency reaches the term frequency threshold, it is considered that the frequency of use of the domain seed term is high, and the domain seed term can be determined as a domain new term, thereby improving the feasibility of the solution.

In some embodiments, on the basis of the embodiment corresponding to FIG. 12 above, in another embodiment of the text mining apparatus 20 provided in the embodiments of this application, the text mining apparatus 20 further includes a training module 203.

The obtaining module 201 is further configured to obtain K groups of domain candidate term samples, each group of domain candidate term samples including a domain candidate term positive sample and a domain candidate term negative sample, the domain candidate term positive sample being from a positive sample pool, the domain candidate term negative sample being from a negative sample pool, and K being an integer greater than or equal to 1.

The obtaining module 201 is further configured to obtain K groups of domain candidate term sample features according to the K groups of domain candidate term samples, the domain candidate term sample features and the domain candidate term samples having a one-to-one correspondence, and each domain candidate term sample feature including a domain candidate term sample feature corresponding to the domain candidate term positive sample and a domain candidate term sample feature corresponding to the domain candidate term negative sample.

The obtaining module 201 is further configured to obtain K groups of prediction results based on the K groups of domain candidate term sample features by using a to-be-trained text score estimation model, the prediction results and the domain candidate term sample features having a one-to-one correspondence, and each group of prediction result including a predicted label of the domain candidate term positive sample and a predicted label of the domain candidate term negative sample.

The training module 203 is configured to train the to-be-trained text score estimation model according to the K groups of prediction results and the K groups of domain candidate term samples until a model training condition is satisfied, and outputting a text score estimation model.

The obtaining module 201 is further configured to obtain the term quality scores corresponding to the domain candidate terms based on the domain candidate term features by using the text score estimation model.

In the embodiments of this application, a text mining apparatus based on artificial intelligence is provided. With the apparatus, positive and negative samples can be constructed using an accumulated general vocabulary database and domain corpus, and then the text score prediction model with supervised machine learning is trained to predict the term quality scores of the domain candidate terms. The selected text score estimation model can maximize the use of all the features of the domain candidate terms, and can adapt to domain candidate term positive samples and domain candidate term negative samples that are not very accurate. Based on a comprehensive consideration, a random forest model can be used for learning to achieve the above effect.

In some embodiments, on the basis of the embodiment corresponding to FIG. 12 above, in another embodiment of the text mining apparatus 20 provided in the embodiments of this application, the text mining apparatus 20 further includes a processing module 204.

The obtaining module 201 is further configured to obtain sentences from a domain corpus before obtaining the K groups of domain candidate term samples.

The processing module 204 is configured to perform term segmentation processing on the sentences to obtain a text sequence.

The obtaining module 201 is further configured to obtain a to-be-trained domain candidate term sample according to the text sequence.

The determining module 202 is further configured to determine that the to-be-trained domain candidate term sample is a domain candidate term positive sample and adding the to-be-trained domain candidate term sample to the positive sample pool, in response to the to-be-trained domain candidate term sample hitting a general vocabulary database.

The determining module 202 is further configured to determine that the to-be-trained domain candidate term sample is a domain candidate term negative sample and adding the to-be-trained domain candidate term sample to the negative sample pool, in response to the to-be-trained domain candidate term sample not hitting the general vocabulary database.

In the embodiments of this application, a text mining apparatus based on artificial intelligence is provided. With the apparatus, the domain candidate term samples can be more accurately classified into the positive sample pool or the negative sample pool by using the general vocabulary database, so as to facilitate subsequent training and improve the accuracy of training. In addition, matching based on the general vocabulary database avoids the process of manually classifying positive and negative samples, thereby improving the training efficiency.

Figure 13:
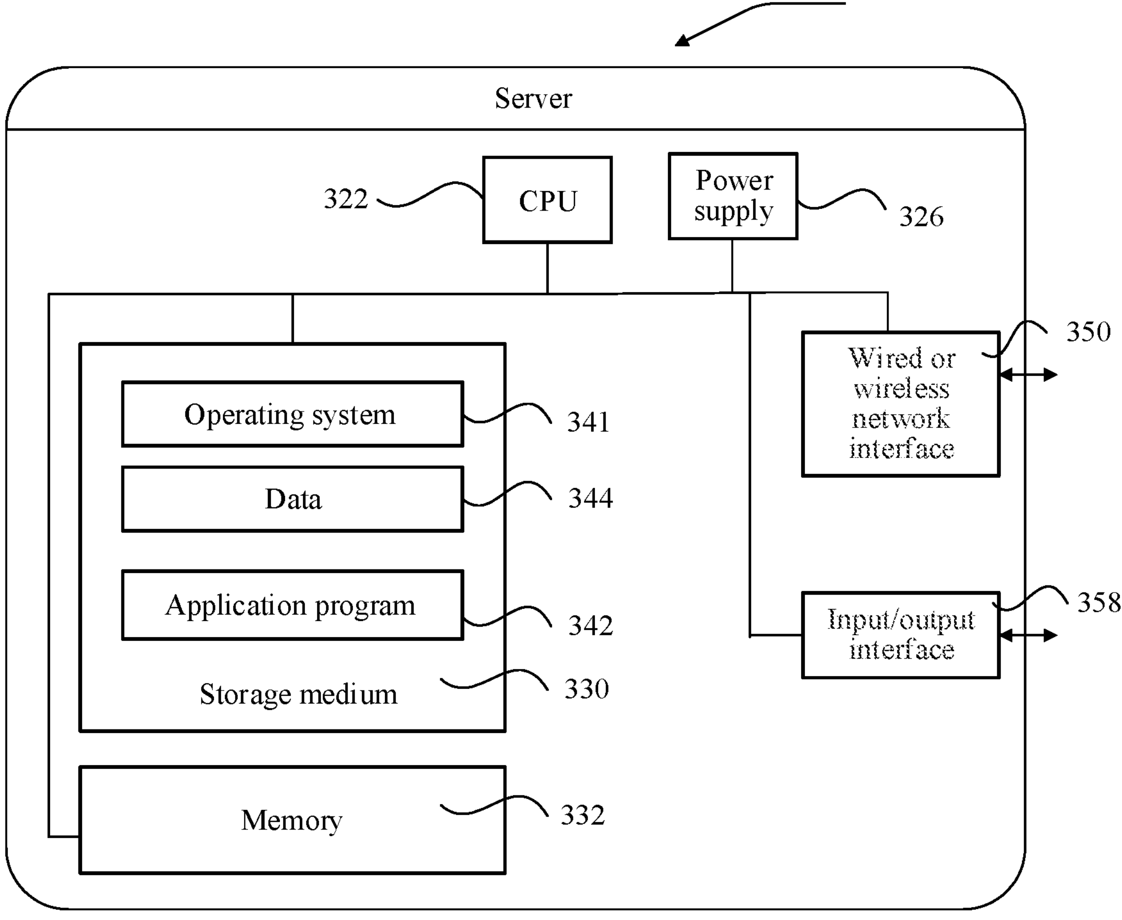
FIG. 13 is a schematic structural diagram of a server according to an embodiment of this application.

The embodiments of this application further provide another image text mining apparatus. The text mining apparatus may be deployed on a server. FIG. 13 is a schematic structural diagram of a server according to an embodiment of this application. The server 300 may vary greatly due different configurations or performance, and may include one or more central processing units (CPU) 322 (for example, one or more processors) and memories 332, and one or more storage media 330 (for example, one or more mass storage devices) storing an application program 342 or data 344. The memory 332 and the storage medium 330 may be transient or persistent storages. The program stored in the storage medium 330 may include one or more modules (not marked in the figure), and each module may include a series of instruction operations to the server. Further, the CPU 322 may be configured to communicate with the storage medium 330, and perform, on the server 300, the series of instruction operations in the storage medium 330.

The server 300 may further include one or more power supplies 326, one or more wired or wireless network interfaces 350, one or more input/output interfaces 358, and/or one or more operating systems 341, for example, Windows Server™, Mac OS X™, Unix™, Linux™, or FreeBSD™.

The steps performed by the server in the foregoing embodiment may be based on the server structure shown in FIG. 13.

Figure 14:
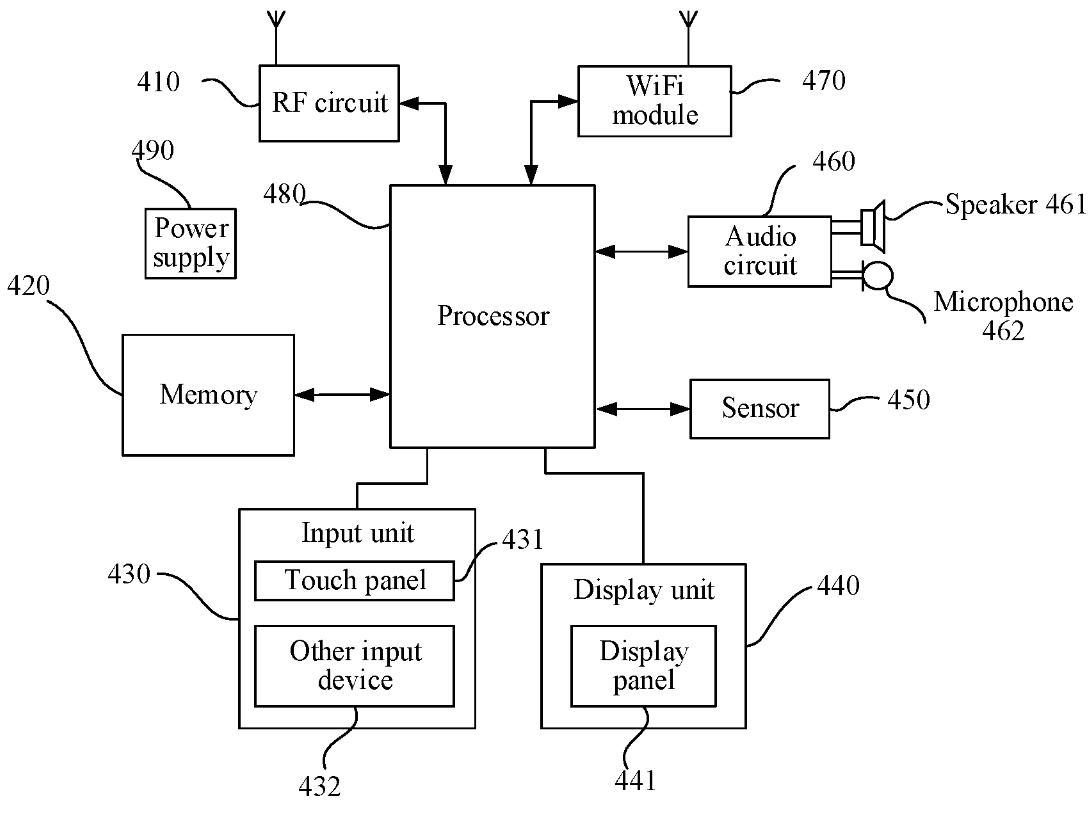
FIG. 14 is a schematic structural diagram of a terminal device according to an embodiment of this application.

The embodiments of this application further provide another image text mining apparatus. The text mining apparatus may be deployed on a terminal device. As shown in FIG. 14, for ease of description, only parts related to the embodiments of this application are shown. For specific technical details that are not disclosed, refer to the method part in the embodiments of this application. The terminal device may be any terminal device including a mobile phone, a tablet computer, a personal digital assistant (PDA), a point of sales (POS), and an on-board computer, and the terminal device being a mobile phone is used as an example.

FIG. 14 is a block diagram of a structure of a part of a mobile phone related to a terminal device according to an embodiment of this application. Referring to FIG. 14, the mobile phone includes components such as: a radio frequency (RF) circuit 410, a memory 420, an input unit 430, a display unit 440, a sensor 450, an audio circuit 460, a wireless fidelity (WiFi) module 470, a processor 480, and a power supply 490. A person skilled in the art may understand that the structure of the mobile phone shown in FIG. 14 does not constitute a limitation on the mobile phone, and the mobile phone may include more components or fewer components than those shown in the figure, or some components may be combined, or a different component deployment may be used.

The following makes a detailed description of the components of the mobile phone with reference to FIG. 14:

the input unit 430 may be configured to receive inputted digit or character information, and generate a keyboard signal input related to the user setting and function control of the mobile phone. Specifically, the input unit 430 may include a touch panel 431 and another input device 432. The display unit 440 may be configured to display information inputted by the user or information provided for the user, and various menus of the mobile phone. The display unit 440 may include a display panel 441.

The audio circuit 460, a speaker 461, and a microphone 462 may provide audio interfaces between the user and the mobile phone.

In this embodiment of this application, the processor 480 included in the terminal device further has the following functions:

obtaining domain candidate term features corresponding to domain candidate terms;

obtaining term quality scores corresponding to the domain candidate terms according to the domain candidate term features;

determining a new term from the domain candidate terms according to the term quality scores corresponding to the domain candidate terms;

obtaining an associated text according to the new term; and determining a domain seed term as a domain new term in response to determining according to the associated text that the domain seed term satisfies a domain new term mining condition.

In some embodiments, the processor 480 is further configured to execute the methods described in the foregoing embodiments.

The embodiments of this application further provide a computer-readable storage medium, storing a computer program which, when runs on a computer, causes the computer to execute the methods described in the foregoing embodiments.

An embodiment of this application further provides a computer program product including a program, the program, when run on a computer, causing the computer to perform the methods according to the foregoing embodiments.

A person skilled in the art may clearly understand that, for the purpose of convenient and brief description, for a detailed working process of the system, apparatus, and unit described above, refer to a corresponding process in the method embodiments, and details are not described herein again.

In the several embodiments provided in this application, it is to be understood that the disclosed system, apparatus, and method may be implemented in other manners. For example, the described apparatus embodiments are only exemplary. For example, the division of the units is only a logical function division and may be other divisions during actual implementation. For example, a plurality of units or components may be combined or integrated into another system, or some features may be ignored or not performed. In addition, the shown or discussed mutual couplings or direct couplings or communication connections may be implemented through some interfaces. The indirect couplings or communication connections between the apparatus or units may be implemented in electronic, mechanical, or other forms.

The units described as separate parts may or may not be physically separate. Parts displayed as units may or may not be physical units, and may be located in one position, or may be distributed on a plurality of network units. Some or all of the units may be selected according to an actual requirement to achieve the objectives of the solutions in the embodiments.

In addition, functional units in the embodiments of this application may be integrated into one processing unit, or each of the units may exist alone physically, or two or more units are integrated into one unit. The integrated unit may be implemented in the form of hardware, or may be implemented in the form of a software function unit.

When the integrated unit is implemented in the form of a software functional unit and sold or used as an independent product, the integrated unit may be stored in a computer-readable storage medium. Based on such an understanding, the technical solutions of this application essentially, or the part contributing to the related art, or all or some of the technical solutions may be implemented in a form of a software product. The software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (ROM), a RAM, a magnetic disk, a compact disc, or the like.

The foregoing embodiments are merely intended for describing the technical solutions of this application, but not for limiting this application. It is to be understood by a person of ordinary skill in the art that although this application has been described in detail with reference to the foregoing embodiments, modifications can be made to the technical solutions described in the foregoing embodiments, or equivalent replacements can be made to some technical features in the technical solutions, as long as such modifications or replacements do not cause the essence of corresponding technical solutions to depart from the spirit and scope of the technical solutions of the embodiments of this application. In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

What is claimed is:

1. A text mining method based on artificial intelligence performed by a computer device, the method comprising:

obtaining a plurality of training domain candidate terms;

constructing a positive sample pool and a negative sample pool by classifying the plurality of training domain candidate terms based on a general vocabulary database, including, for each respective training domain candidate term of the plurality of training domain candidate terms:

adding the respective training domain candidate term to the positive sample pool in response to a determination that the respective training domain candidate term belongs to the general vocabulary database; and adding the respective training domain candidate term to the negative sample pool in response to a determination that the respective training domain candidate term does not belong to the general vocabulary database;

training a random forest model including a plurality of decision trees, including:

constructing a plurality of groups of domain candidate term samples, wherein each group of domain candidate term samples includes a positive domain candidate term sample selected from the positive sample pool and a negative domain candidate term sample selected from the negative sample pool; and training each of the plurality of decision trees in the random forest model using a different group of the plurality of groups of domain candidate term samples;

obtaining domain candidate term features corresponding to domain candidate terms;

obtaining term quality scores corresponding to the domain candidate terms according to the domain candidate term features, including:

obtaining sub-scores corresponding to the domain candidate term features based on the domain candidate term features by using each of the plurality of decision trees in the random forest model; and obtaining the term quality scores corresponding to the domain candidate terms according to the sub-scores corresponding to the domain candidate term features;

determining a new term from the domain candidate terms according to the term quality scores corresponding to the domain candidate terms;

obtaining an associated text according to the new term; and determining a domain seed term as a domain new term in response to determining according to the associated text that the domain seed term satisfies a domain new term mining condition.

2. The method according to claim 1, further comprising:

obtaining sentences from a domain corpus;

performing term segmentation processing on each of the sentences to obtain a text sequence; and obtaining the domain candidate terms according to the text sequence.

3. The method according to claim 1, wherein the determining a new term according to the term quality scores corresponding to the domain candidate terms comprises:

determining that a domain candidate term is a new term in response to the term quality score corresponding to the domain candidate term being greater than or equal to a quality score threshold; and determining that a domain candidate term is not a new term in response to the term quality score corresponding to the domain candidate term being less than the quality score threshold.

4. The method according to claim 1, wherein the determining a new term according to the term quality scores corresponding to the domain candidate terms comprises:

obtaining term frequencies corresponding to the domain candidate terms;

determining that a domain candidate term is a new term in response to the term quality score corresponding to the domain candidate term being greater than or equal to a quality score threshold and a term frequency corresponding to the domain candidate term being greater than or equal to a first term frequency threshold; and determining that a domain candidate term is not a new term in response to the term quality score corresponding to the domain candidate term being less than the quality score threshold and the term frequency corresponding to the domain candidate term being less than the first term frequency threshold.

5. The method according to claim 1, wherein the obtaining an associated text according to the new term comprises:

obtaining a search feedback result corresponding to the new term through a search engine, the search feedback result comprising at least one search result; and determining, according to the search feedback result corresponding to the new term, first R search results with highest degrees of relevance from the at least one search result as the associated text corresponding to the new term, R being an integer greater than or equal to 1.

6. The method according to claim 1, further comprising:
obtaining the domain seed term;
determining an average term frequency of the domain seed term according to the associated text; and
determining that the domain seed term satisfies the domain new term mining condition in response to the average term frequency being greater than or equal to a second term frequency threshold.

7. The method according to claim 1, further comprising:
obtaining the domain seed term;
determining a maximum term frequency of the domain seed term according to the associated text; and
determining that the domain seed term satisfies the domain new term mining condition in response to the maximum term frequency being greater than or equal to a second term frequency threshold.

8. A computer device, comprising: a memory, a processor, and a bus system, the bus system being configured to connect the memory and the processor to enable the memory and the processor to communicate with each other,
the memory being configured to store a program,
the processor being configured to execute the program in the memory and causing the computer device to perform a text mining method based on artificial intelligence including:
obtaining a plurality of training domain candidate terms;
constructing a positive sample pool and a negative sample pool by classifying the plurality of training domain candidate terms based on a general vocabulary database, including, for each respective training domain candidate term of the plurality of training domain candidate terms:
adding the respective training domain candidate term to the positive sample pool in response to a determination that the respective training domain candidate term belongs to the general vocabulary database; and
adding the respective training domain candidate term to the negative sample pool in response to a determination that the respective training domain candidate term does not belong to the general vocabulary database;
training a random forest model including a plurality of decision trees, including:
constructing a plurality of groups of domain candidate term samples, wherein each group of domain candidate term samples includes a positive domain candidate term sample selected from the positive sample pool and a negative domain candidate term sample selected from the negative sample pool; and
training each of the plurality of decision trees in the random forest model using a different group of the plurality of groups of domain candidate term samples;
obtaining domain candidate term features corresponding to domain candidate terms;
obtaining term quality scores corresponding to the domain candidate terms according to the domain candidate term features, including:
obtaining sub-scores corresponding to the domain candidate term features based on the domain candidate term features by using each of the plurality of decision trees in the random forest model; and
obtaining the term quality scores corresponding to the domain candidate terms according to the sub-scores corresponding to the domain candidate term features;
determining a new term from the domain candidate terms according to the term quality scores corresponding to the domain candidate terms;
obtaining an associated text according to the new term; and
determining a domain seed term as a domain new term in response to determining according to the associated text that the domain seed term satisfies a domain new term mining condition.

9. The computer device according to claim 8, wherein the method further comprises:
obtaining sentences from a domain corpus;
performing term segmentation processing on each of the sentences to obtain a text sequence; and
obtaining the domain candidate terms according to the text sequence.

10. The computer device according to claim 8, wherein the determining a new term according to the term quality scores corresponding to the domain candidate terms comprises:
determining that a domain candidate term is a new term in response to the term quality score corresponding to the domain candidate term being greater than or equal to a quality score threshold; and
determining that a domain candidate term is not a new term in response to the term quality score corresponding to the domain candidate term being less than the quality score threshold.

11. The computer device according to claim 8, wherein the determining a new term according to the term quality scores corresponding to the domain candidate terms comprises:
obtaining term frequencies corresponding to the domain candidate terms;
determining that a domain candidate term is a new term in response to the term quality score corresponding to the domain candidate term being greater than or equal to a quality score threshold and a term frequency corresponding to the domain candidate term being greater than or equal to a first term frequency threshold; and
determining that a domain candidate term is not a new term in response to the term quality score corresponding to the domain candidate term being less than the quality score threshold and the term frequency corresponding to the domain candidate term being less than the first term frequency threshold.

12. The computer device according to claim 8, wherein the obtaining an associated text according to the new term comprises:
obtaining a search feedback result corresponding to the new term through a search engine, the search feedback result comprising at least one search result; and
determining, according to the search feedback result corresponding to the new term, first R search results with highest degrees of relevance from the at least one search result as the associated text corresponding to the new term, R being an integer greater than or equal to 1.

13. The computer device according to claim 8, wherein the method further comprises:
obtaining the domain seed term;
determining an average term frequency of the domain seed term according to the associated text; and
determining that the domain seed term satisfies the domain new term mining condition in response to the average term frequency being greater than or equal to a second term frequency threshold.

14. The computer device according to claim 8, wherein the method further comprises:

obtaining the domain seed term;

determining a maximum term frequency of the domain seed term according to the associated text; and determining that the domain seed term satisfies the domain new term mining condition in response to the maximum term frequency being greater than or equal to a second term frequency threshold.

15. A non-transitory computer-readable storage medium, storing a computer program that, when executed by a processor of a computer device, causes the computer device to perform a text mining method based on artificial intelligence including:

obtaining a plurality of training domain candidate terms;

constructing a positive sample pool and a negative sample pool by classifying the plurality of training domain candidate terms based on a general vocabulary database, including, for each respective training domain candidate term of the plurality of training domain candidate terms:

adding the respective training domain candidate term to the positive sample pool in response to a determination that the respective training domain candidate term belongs to the general vocabulary database; and adding the respective training domain candidate term to the negative sample pool in response to a determination that the respective training domain candidate term does not belong to the general vocabulary database;

training a random forest model including a plurality of decision trees, including:

constructing a plurality of groups of domain candidate term samples, wherein each group of domain candidate term samples includes a positive domain candidate term sample selected from the positive sample pool and a negative domain candidate term sample selected from the negative sample pool; and training each of the plurality of decision trees in the random forest model using a different group of the plurality of groups of domain candidate term samples;

obtaining domain candidate term features corresponding to domain candidate terms;

obtaining term quality scores corresponding to the domain candidate terms according to the domain candidate term features, including:

obtaining sub-scores corresponding to the domain candidate term features based on the domain candidate term features by using each of the plurality of decision trees in the random forest model; and obtaining the term quality scores corresponding to the domain candidate terms according to the sub-scores corresponding to the domain candidate term features;

determining a new term from the domain candidate terms according to the term quality scores corresponding to the domain candidate terms;

obtaining an associated text according to the new term; and determining a domain seed term as a domain new term in response to determining according to the associated text that the domain seed term satisfies a domain new term mining condition.

16. The non-transitory computer-readable storage medium according to claim 15, wherein the method further comprises:

obtaining sentences from a domain corpus;

performing term segmentation processing on each of the sentences to obtain a text sequence; and obtaining the domain candidate terms according to the text sequence.

17. The non-transitory computer-readable storage medium according to claim 15, wherein the method further comprises:

obtaining the domain seed term;

determining an average term frequency of the domain seed term according to the associated text; and determining that the domain seed term satisfies the domain new term mining condition in response to the average term frequency being greater than or equal to a second term frequency threshold.

18. The non-transitory computer-readable storage medium according to claim 15, wherein the method further comprises:

obtaining the domain seed term;

determining a maximum term frequency of the domain seed term according to the associated text; and determining that the domain seed term satisfies the domain new term mining condition in response to the maximum term frequency being greater than or equal to a second term frequency threshold.

* * * * *